United States Patent
Araki

(10) Patent No.: US 10,414,929 B2
(45) Date of Patent: Sep. 17, 2019

(54) INKJET INK COMPOSITION, INKJET RECORDING METHOD, INK SET, DECORATIVE SHEET, DECORATIVE SHEET MOLDED PRODUCT, PROCESS FOR PRODUCING IN-MOLD MOLDED ARTICLE, AND IN-MOLD MOLDED ARTICLE

(71) Applicant: FUJIFILM Corporation, Tokyo (JP)

(72) Inventor: Kenjiro Araki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 739 days.

(21) Appl. No.: 14/839,422

(22) Filed: Aug. 28, 2015

(65) Prior Publication Data

US 2015/0368491 A1 Dec. 24, 2015

Related U.S. Application Data

(63) Continuation of application No. PCT/JP2014/056271, filed on Mar. 11, 2014.

(30) Foreign Application Priority Data

Mar. 12, 2013 (JP) ................................ 2013-048566

(51) Int. Cl.
| | | |
|---|---|---|
| *C09D 11/322* | (2014.01) | |
| *C08K 5/3437* | (2006.01) | |
| *B32B 27/08* | (2006.01) | |
| *C09D 139/04* | (2006.01) | |
| *B32B 27/16* | (2006.01) | |
| *C09D 11/101* | (2014.01) | |
| *C09D 11/106* | (2014.01) | |
| *C09D 11/40* | (2014.01) | |

(52) U.S. Cl.
CPC ............ *C09D 11/322* (2013.01); *B32B 27/08* (2013.01); *B32B 27/16* (2013.01); *C08K 5/3437* (2013.01); *C09D 11/101* (2013.01); *C09D 11/106* (2013.01); *C09D 11/40* (2013.01); *C09D 139/04* (2013.01); *B32B 2255/10* (2013.01); *B32B 2451/00* (2013.01); *Y10T 428/24273* (2015.01); *Y10T 428/24901* (2015.01)

(58) Field of Classification Search
CPC .................................................... C09D 11/30
See application file for complete search history.

(56) References Cited

U.S. PATENT DOCUMENTS

| | | | | |
|---|---|---|---|---|
| 5,367,009 A | * | 11/1994 | Inoue .................... | B01F 17/005 106/236 |
| 2008/0075882 A1 | * | 3/2008 | Hayata .................... | B29C 59/02 427/542 |
| 2008/0241424 A1 | * | 10/2008 | Nakamura ........... | C09D 11/101 427/595 |
| 2015/0030825 A1 | * | 1/2015 | Ishima ................. | C09D 11/326 428/207 |

FOREIGN PATENT DOCUMENTS

| | | | | |
|---|---|---|---|---|
| CN | 104093795 A | | 10/2014 | |
| JP | 09255843 A | * | 9/1997 | |
| JP | 2008-105393 A | | 5/2008 | |
| JP | 2010-514862 A | | 5/2010 | |
| JP | 2010-521330 A | | 6/2010 | |
| JP | WO 2013118735 A1 | * | 8/2013 | ........... C09D 11/101 |
| WO | 2008/074589 A1 | | 6/2008 | |
| WO | 2008/080579 A1 | | 7/2008 | |

OTHER PUBLICATIONS

Machine Translation of JP 09-255843 (Year: 1997).*
An Office Action issued by the Chinese Patent Office dated Jul. 5, 2016, which corresponds to Chinese Patent Application No. 201480025134.7 and is related to U.S. Appl. No. 14/839,422; with English language translation.
BYK Additives & Instruments; High Molecular Weight Wetting and Dispersing Additive for Solvent-Free UV-Curable Inkjet Inks. Suitable for All Pigment Types; Oct. 2014.
International Search Report for PCT/JP2014/056271 dated Jun. 17, 2014.
An Office Action "Notification of Reasons for Refusal" issued by the Japanese Patent Office dated May 24, 2016, which corresponds to Japanese Patent Application No. 2013-048566 and is related to U.S. Appl. No. 14/839,422; with English language translation.

* cited by examiner

Primary Examiner — Scott R. Walshon
Assistant Examiner — Sathavaram I Reddy
(74) Attorney, Agent, or Firm — Studebaker & Brackett PC

(57) ABSTRACT

An inkjet ink composition includes a maleimide-styrene copolymer having an ammonium salt structure as a Component A, an N-vinyl compound as a Component B, a colorant as a Component C, and a photopolymerization initiator as a Component D. An inkjet recording method includes discharging an inkjet ink composition onto a resin sheet by an inkjet method, and curing the inkjet ink composition by irradiating the discharged inkjet ink composition with actinic radiation.

18 Claims, No Drawings

INKJET INK COMPOSITION, INKJET RECORDING METHOD, INK SET, DECORATIVE SHEET, DECORATIVE SHEET MOLDED PRODUCT, PROCESS FOR PRODUCING IN-MOLD MOLDED ARTICLE, AND IN-MOLD MOLDED ARTICLE

CROSS-REFERENCE TO RELATED APPLICATIONS

This application is a Continuation of PCT International Application No. PCT/JP2014/056271 filed on Mar. 11, 2014, which claims priority under 35 U.S.C. § 119(a) to Japanese Patent Application No. 2013-048566 filed on Mar. 12, 2013. The contents of these applications are incorporated herein by reference in their entirety.

TECHNICAL FIELD

The present invention relates to an inkjet ink composition, an inkjet recording method, an ink set, a decorative sheet, a decorative sheet molded product, a process for producing an in-mold molded article, and an in-mold molded article.

BACKGROUND ART

As image recording methods for forming an image on a recording medium such as paper based on an image data signal, there are an electrophotographic system, sublimation type and melt type thermal transfer systems, an inkjet system, etc. For example, with regard to the inkjet system, since it can be carried out using inexpensive equipment and an image is formed directly on a recording medium by discharging an ink composition only on a required image area, the ink composition can be used efficiently and the running cost is low. Furthermore, there is little noise and it is excellent as an image recording device.

In accordance with the inkjet method, printing is possible not only on plain paper but also a non-water-absorbing recording medium such as a plastic sheet or a metal plate, but achieving high speed when printing and achieving high image quality are important issues, and the inkjet method has the property that the time taken for drying and curing a droplet after printing greatly influences the productivity of a printed material and the sharpness of an image obtained by printing.

As one inkjet method, there is a recording method using an ink for inkjet recording that can be cured by irradiation with actinic energy ray. In accordance with this method, the productivity of printed images is improved and a sharp image can be formed by curing an ink droplet by applying actinic energy ray immediately after ink discharge or after a predetermined time has elapsed.

As conventional ink compositions, ink compositions described in JP-A-2010-521330 (JP-A denotes a Japanese unexamined patent application publication) and JP-A-2010-514862 are known.

SUMMARY OF THE INVENTION

Problems to be Solved by the Invention

It is an object of the present invention to provide an inkjet ink composition that is excellent in terms of storage stability, inkjet discharge stability, and curability and gives an image having excellent stretchability at high temperature, and an inkjet recording method, ink set, decorative sheet, decorative sheet molded product, a process for producing an in-mold molded article, and in-mold molded article that employ the inkjet ink composition.

Means for Solving the Problems

The objects have been attained by means described in <1>, <12>, <13>, <15>, <16>, <18>, and <19>. They are shown below together with <2> to <11>, <14>, and <17>, which are preferred Embodiments.

<1> An inkjet ink composition comprising (Component A) a maleimide-styrene copolymer having an ammonium salt structure, (Component B) an N-vinyl compound, (Component C) a colorant, and (Component D) a photopolymerization initiator, <2> the inkjet ink composition according to <1> above, wherein Component A has a weight-average molecular weight of 1,500 to 10,000, <3> the inkjet ink composition according to <1> or <2> above, wherein Component A has an ethylene oxide structure and/or a propylene oxide structure, <4> the inkjet ink composition according to any one of <1> to <3> above, wherein Component A is a copolymer having at least a structure represented by Formula (A-1) below,

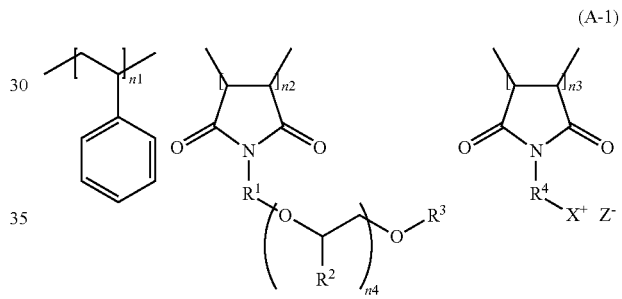

wherein in Formula (A-1) above $R^1$ denotes an alkylene group, the $R^2$s independently denote a hydrogen atom or a methyl group, $R^3$ denotes a hydrogen atom or an alkyl group, $R^4$ denotes an alkylene group, $X^+$ denotes a quaternary ammonium group, $Z^-$ denotes a counteranion, n1, n2, and n3 independently denote the molar ratio of the respective constituent unit, (n1):(n2+n3)=1:99 to 99:1 is satisfied, n2:n3=1:99 to 99:1 is satisfied, and n4 denotes an integer of 1 or greater, <5> the inkjet ink composition according to any one of <1> to <4> above, wherein Component A has a content of 0.01 to 5 mass % relative to the total mass of the inkjet ink composition, <6> the inkjet ink composition according to any one of <1> to <5> above, wherein Component B has a content of 1 to 40 mass % relative to the total mass of the inkjet ink composition, <7> the inkjet ink composition according to any one of <1> to <6> above, wherein Component C is a quinacridone pigment, <8> the inkjet ink composition according to any one of <1> to <7> above, wherein Component B is N-vinylcaprolactam, <9> the inkjet ink composition according to any one of <1> to <8> above, wherein Component D comprises an acylphosphine oxide compound, <10> the inkjet ink composition according to any one of <1> to <9> above, wherein the inkjet ink composition comprises (Component E) a monomer having a viscosity at 25° C. of no greater than 10 mPa·s in an amount of at least 30 mass % relative to the total mass of the inkjet ink composition, <11> the inkjet ink composition according to <10> above, wherein Component E comprises at least one type of compound selected from the group of compounds below

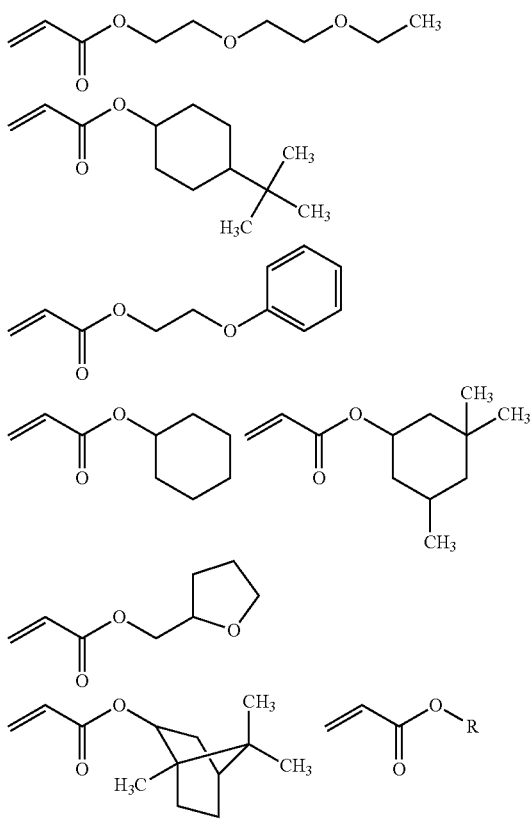

wherein R in the compounds denotes an alkyl group having 4 to 18 carbons,
<12> an ink set comprising the inkjet ink composition according to any one of <1> to <11> above,
<13> an inkjet recording method comprising (a1) a step of discharging the inkjet ink composition according to any one of <1> to <11> above onto a resin sheet by an inkjet method, and (b1) a step of curing the inkjet ink composition by irradiating the discharged inkjet ink composition with actinic radiation,
<14> the inkjet recording method according to <13> above, wherein the light source for the actinic radiation is a light-emitting diode,
<15> a decorative sheet comprising an image layer provided above a resin sheet by curing the inkjet ink composition according to any one of <1> to <11> above,
<16> a decorative sheet molded product obtained by subjecting the decorative sheet according to <15> above to vacuum forming, pressure forming, or vacuum/pressure forming,
<17> the decorative sheet molded product according to <16> above, wherein the decorative sheet molded product is further subjected to hole making and/or cutting subsequent to the vacuum forming, pressure forming, or vacuum/pressure forming,
<18> a process for producing an in-mold molded article, comprising a step of placing the decorative sheet according to <15> above or the decorative sheet molded product according to <16> or <17> above on an inner wall of a cavity part formed by a plurality of molds, and a step of injecting a molten resin into the cavity part via a gate, and
<19> an in-mold molded article obtained by the production process according to <18> above.

MODES FOR CARRYING OUT THE INVENTION

The present invention is explained in detail below.
In the specification, the notation 'xx to yy' means a numerical range that includes xx and yy. Furthermore, a 'maleimide-styrene copolymer having an ammonium salt structure (Component A)', etc. is also simply called 'Component A', etc.
'(Meth)acrylate', etc. has the same meaning as that of 'acrylate and/or methacrylate', etc, and the same applies below.
Furthermore, in the present invention, 'mass %' has the same meaning as that of 'wt %, and 'parts by mass' has the same meaning as that of 'parts by weight'.
1. Inkjet Ink Composition
The inkjet ink composition of the present invention (hereinafter, also simply called an 'ink composition') comprises (Component A) a maleimide-styrene copolymer having an ammonium salt structure, (Component B) an N-vinyl compound, (Component C) a colorant, and (Component D) a photopolymerization initiator.
In the present specification, the 'maleimide-styrene copolymer' is also called a 'styrene-maleimide copolymer'.
Furthermore, the inkjet ink composition of the present invention may suitably be used as the radiation curable inkjet ink composition of the present invention.
The ink composition of the present invention is an ink composition that can cure upon exposure to actinic radiation and is also an oil-based ink composition. The 'actinic radiation' referred to in the present invention is not particularly limited as long as it is actinic radiation that can provide energy that enables an initiating species to be generated in the ink composition when irradiated, and broadly includes α rays, γ rays, X rays, ultraviolet rays, visible light, and an electron beam. Among them, ultraviolet rays and an electron beam are preferable from the viewpoint of curing sensitivity and the availability of equipment, and ultraviolet rays are particularly preferable. The ink composition of the present invention is therefore preferably an ink composition that can cure upon exposure to ultraviolet rays as actinic radiation.
An N-vinyl compound is a monomer having excellent curability, but an inkjet ink composition comprising an N-vinyl compound has the problems that inkjet discharge properties and pigment dispersibility are degraded, and since it cannot withstand stretching during molding, cracking or peeling off from a substrate occurs.
Furthermore, with regard to an ink composition applied to a printed sheet (decorative sheet) that is to be molded, since an ink film is stretched at high temperature during molding, excellent stretchability at high temperature is required.
As a result of an intensive investigation by the present inventors, it has been found that the problems can be solved by the use of an inkjet ink composition comprising (Component A) a maleimide-styrene copolymer having an ammonium salt structure, (Component B) an N-vinyl compound, (Component C) a colorant, and (Component D) a photopolymerization initiator, and the present invention has thus been accomplished.
(Component A) Maleimide-Styrene Copolymer Having Ammonium Salt Structure
The inkjet ink composition of the present invention comprises (Component A) a maleimide-styrene copolymer having an ammonium salt structure.

Component A is a copolymer having a structure similar to that of a copolymer formed by copolymerization of a maleimide compound and a styrene compound, and may be a copolymer formed by copolymerization with a compound other than a maleimide compound or a styrene compound. Furthermore, Component A may be formed by copolymerization of one type each of maleimide compound and styrene compound or by copolymerization of two or more types of either or both thereof.

Moreover, Component A may be a copolymer in which its maleimide structure is formed by copolymerization with a compound other than a maleimide compound and then carrying out a polymer reaction. Specifically, for example, a maleic anhydride-styrene copolymer may be reacted with an amine compound to thus form a maleimide-styrene copolymer. In the present invention, a constituent unit having a maleimide structure formed by a polymer reaction is also called a maleimide compound-derived constituent unit.

It is surmised that Component A functions as a dispersant in the ink composition. An ink composition is often prepared by first preparing a mill base (dispersion) containing a colorant and a dispersant and then mixing the mill base with another component such as a monomer, but the effect of the present invention can be exhibited even by adding Component A while preparing a mill base or adding it when mixing a mill base with another component. In particular, an embodiment in which a dispersant other than Component A that is described later is added to a mill base and Component A is added when mixing the mill base and another component is preferable.

The position of the ammonium salt structure in Component A is not particularly limited; for example, it may be present in a maleimide compound-derived constituent unit or a styrene compound-derived constituent unit, but it may preferably be present in a maleimide compound-derived constituent unit.

Furthermore, the ammonium salt structure in Component A is preferably a structure represented by Formula (A-a) below. Furthermore, Component A may have two or more types of structures represented by Formula (A-a).

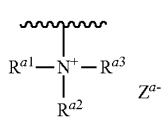

(A-a)

(In Formula (A-a), $R^{a1}$ to $R^{a3}$ independently denote a hydrogen atom, an alkyl group, or an aryl group, $Z^{a-}$ denotes a counteranion, and the wavy line portion denotes the position of bonding to another structure.)

$R^{a1}$ to $R^{a3}$ are preferably independently alkyl groups or aryl groups, more preferably alkyl groups having 1 to 20 carbons or aryl groups having 6 to 10 carbons, yet more preferably alkyl groups having 1 to 20 carbons, particularly preferably alkyl groups having 1 to 8 carbons, and most preferably methyl groups. With this embodiment, inkjet discharge properties and dispersibility are excellent.

From the viewpoint of synthesis, at least one of $R^{a1}$ to $R^{a3}$ is preferably a methyl group, and $R^{a1}$ to $R^{a3}$ are preferably the same group.

$Z^{a-}$ may be a counteranion that neutralizes the entire charge of Component A, may be a monovalent counteranion or a polyvalent counteranion, and is preferably a monovalent counteranion.

Furthermore, $Z^{a-}$ is preferably an anion selected from the group consisting of a halide ion, a sulfate anion, a bisulfate anion, a sulfonate anion, a carboxylate anion, a nitrate anion, a phosphate anion, a hydrogenphosphate anion, a dihydrogenphosphate anion, a phosphonate anion, and a borate anion, is more preferably an anion selected from the group consisting of a halide ion, a sulfonate anion, a carboxylate anion, $PF_6^-$, and $BF_4^-$, is yet more preferably a halide ion, and is particularly preferably an iodide ion. With this embodiment, inkjet discharge properties and dispersibility are superior.

Component A preferably has a constituent unit represented by Formula (A-b) below. With this embodiment, inkjet discharge properties and dispersibility are superior.

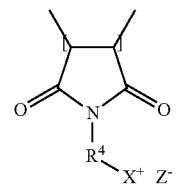

(A-b)

(In Formula (A-b), $R^4$ denotes an alkylene group, $X^+$ denotes a quaternary ammonium group, and $Z^-$ denotes a counteranion.)

The alkylene group denoted by $R^4$ may be straight-chain, have a branch, or have a cyclic structure.

$R^4$ is preferably an alkylene group having 2 to 20 carbons, more preferably an alkylene group having 2 to 8 carbons, yet more preferably an alkylene group having 2 to 4 carbons, and particularly preferably an ethylene group.

$X^+$ and $Z^-$ preferably have a structure represented by Formula (A-a) above.

Component A preferably has an ethylene oxide structure (—OCH$_2$CH$_2$—) and/or a propylene oxide structure (—OCH(CH$_3$)CH$_2$— or —OCH$_2$CH(CH$_3$)—). With this embodiment, stretchability at high temperature during molding is excellent, and inkjet discharge properties and dispersibility are excellent.

Furthermore, Component A preferably has a constituent unit represented by Formula (A-c) below. With this embodiment, stretchability at high temperature during molding is superior and inkjet discharge properties and storage stability are superior.

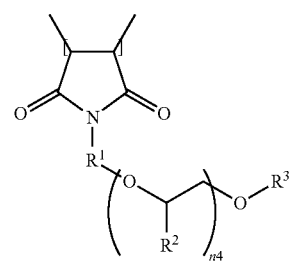

(A-c)

(In Formula (A-c), $R^1$ denotes an alkylene group, the $R^2$s independently denote a hydrogen atom or a methyl group, $R^3$ denotes a hydrogen atom or an alkyl group, and n4 denotes an integer of 1 or greater.)

The alkylene group denoted by $R^1$ may be straight-chain, have a branch, or have a cyclic structure.

$R^1$ is preferably an alkylene group having 2 to 20 carbons, more preferably an alkylene group having 2 to 8 carbons, yet more preferably an alkylene group having 2 to 4 carbons, and particularly preferably an ethylene group.

$R^2$ is preferably a hydrogen atom.

$R^3$ is preferably a hydrogen atom or an alkyl group having 1 to 8 carbons, more preferably a hydrogen atom or an alkyl group having 1 to 4 carbons, yet more preferably a hydrogen atom, a methyl group, or an ethyl group, and particularly preferably a hydrogen atom.

n4 is preferably an integer of 1 to 30, more preferably an integer of 2 to 30, yet more preferably an integer of 2 to 20, particularly preferably an integer of 2 to 8, and most preferably 2.

Component A is a copolymer formed by copolymerization of at least a styrene compound.

Examples of the styrene compound include styrene, 4-methylstyrene, 4-hydroxystyrene, 4-acetoxystyrene, 4-acetylstyrene, and styrenesulfonic acid. Among them, styrene is preferable.

Component A preferably contains a constituent unit represented by Formula (A-d) below.

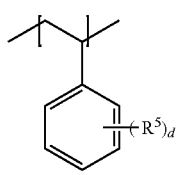

(A-d)

(In Formula (A-d), the $R^5$s independently denote an alkyl group, an aryl group, a hydroxy group, an acyloxy group, an acyl group, or a sulfo group, and d denotes an integer of 0 to 5.)

$R^5$ is preferably an alkyl group.

d is 0 or 1, and preferably 0, that is, a styrene-derived constituent unit is particularly preferable.

Component A is preferably a copolymer having at least a structure represented by Formula (A-1) below.

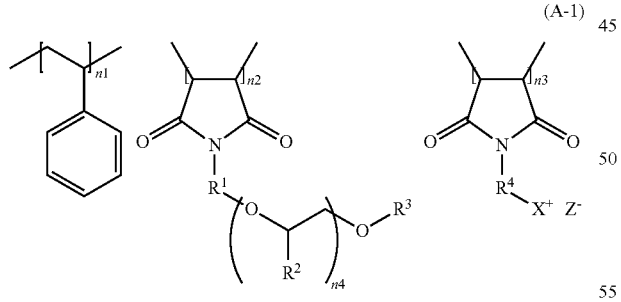

(A-1)

(In Formula (A-1) above, $R^1$ denotes an alkylene group, the $R^2$s independently denote a hydrogen atom or a methyl group, $R^3$ denotes a hydrogen atom or an alkyl group, $R^4$ denotes an alkylene group, $X^+$ denotes a quaternary ammonium group, $Z^-$ denotes a counteranion, n1, n2, and n3 denote the molar ratio of the respective constituent units, (n1):(n2+n3)=1:99 to 99:1 is satisfied, n2:n3=1:99 to 99:1 is satisfied, and n4 denotes an integer of 1 or greater.)

$R^1$, $R^2$, $R^3$, and n4 in Formula (A-1) have the same meanings as those of $R^1$, $R^2$, $R^3$, and n4 in Formula (A-c), and preferred embodiments are also the same.

$R^4$, $X^+$, and $Z^-$ in Formula (A-1) have the same meanings as those of $R^4$, $X^+$, and $Z^-$ in Formula (A-b), and preferred embodiments are also the same.

n1, n2, and n3 denote the molar ratio of the respective constituent units and satisfy the two equations below.

(n1):(n2+n3)=1:99 to 99:1 n2:n3=1:99 to 99:1

Furthermore, n1, n2, and n3 preferably satisfy (n1):(n2+n3)=40:60 to 80:20 and preferably satisfy n2:n3=50:50 to 99:1, more preferably satisfy n2:n3=75:25 to 99:1, and yet more preferably satisfy preferably n2:n3=90:10 to 99:1. With this embodiment, storage stability is superior, and stretchability at high temperature during molding is superior.

The weight-average molecular weight (Mw) of Component A is preferably 1,000 to 50,000, more preferably 1,500 to 10,000, and yet more preferably 3,000 to 8,000. With this embodiment, stretchability at high temperature during molding is superior, and inkjet discharge properties and storage stability are superior.

A synthetic method for Component A is not particularly limited, and it may be synthesized by a known method; for example, a method in which after styrene and maleic anhydride are copolymerized, the maleic anhydride structure is reacted with a compound having at least a primary amino group and a tertiary amino group so as to convert the maleic anhydride structure into a maleimide structure, thus turning the tertiary amino group into a quaternary ammonium structure, can be preferably cited.

Examples of commercially available Components A include BYK JET9150 and BYK JET9151 (both from BYK-CHEMIE GMBH).

With regard to Component A, one type may be used on its own or two types may be used in combination.

The content of Component A contained in the ink composition of the present invention is preferably 0.1 to 10 mass % relative to the total mass of the ink composition, more preferably 0.1 to 5 mass %, and yet more preferably 0.2 to 3 mass %. With this embodiment, stretchability at high temperature during molding is superior, and inkjet discharge properties and storage stability are superior.

(Component B) N-Vinyl Compound

The ink composition of the present invention comprises (Component B) an N-vinyl compound.

The N-vinyl compound is preferably an N-vinyllactam, and more preferably a compound represented by Formula (N).

(N)

In Formula (B), n denotes an integer of 2 to 6; n is preferably an integer of 3 to 6 from the viewpoint of flexibility after the ink composition is cured, adhesion to a recording medium, and ready availability of starting materials, n is more preferably 3 or 5, and n is particularly preferably 5, which is N-vinylcaprolactam. N-vinylcaprolactam is preferable since it has excellent safety, is commonly used and is readily available at a relatively low price, and gives particularly good ink curability and adhesion of a cured film to a recording medium.

The N-vinyllactam may have a substituent such as an alkyl group or an aryl group on the lactam ring, and may have a saturated or unsaturated ring structure bonded to the lactam ring.

The N-vinyl compound may be used singly or in a combination of two or more compounds.

The ink composition of the present invention comprises N-vinyl compound at a content of 5 to 50 mass % relative to the total mass of the ink composition, more preferably 10 to 40 mass %, yet more preferably 15 to 35 mass %, and particularly preferably 20 to 30 mass %. When in the above range, curability and adhesion of an image obtained are excellent.

(Component C) Colorant

The ink composition of the present invention comprises (Component C) a colorant in order to improve the visibility of an image area that is formed.

The colorant is not particularly limited but is preferably a pigment from the viewpoint of excellent weatherability and rich color reproduction. The colorant is preferably selected so that it is a compound that does not function as a polymerization inhibitor from the viewpoint of sensitivity of a curing reaction by actinic radiation not being degraded.

Furthermore, the colorant is particularly preferably a quinacridone pigment. It is difficult to maintain the dispersion stability of a quinacridone pigment in an ink composition after storing at high temperature (60° C.) for four weeks and further storing at room temperature for one year if it is only dispersed using a conventional dispersant, but it has been found that in accordance with the present embodiment, even after storing at high temperature (60° C.) for four weeks and further storing at room temperature for one year, dispersion stability can be sufficiently maintained, and the effect of the present invention is particularly well exhibited.

Preferable examples of the quinacridone pigment include C.I. Pigment Red 122, C.I. Pigment Red 202, C.I. Pigment Red 209, C.I. Pigment Violet 19, and a mixed crystal pigment thereof.

The pigment that can be used in the present invention is not particularly limited and, for example, organic and inorganic pigments having the numbers below described in the Color Index may be used.

That is, as a red or magenta pigment, Pigment Red 3, 5, 19, 22, 31, 38, 42, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, or 257, Pigment Violet 3, 19, 23, 29, 30, 37, 50, or 88, and Pigment Orange 13, 16, 20, or 36; as a blue or cyan pigment, Pigment Blue 1, 15, 15:1, 15:2, 15:3, 15:4, 15:6, 16, 17-1, 22, 27, 28, 29, 36, or 60; as a green pigment, Pigment Green 7, 26, 36, or 50; as a yellow pigment, Pigment Yellow 1, 3, 12, 13, 14, 17, 34, 35, 37, 55, 74, 81, 83, 93, 94, 95, 97, 108, 109, 110, 120, 137, 138, 139, 153, 154, 155, 157, 166, 167, 168, 180, 185, or 193; as a black pigment, Pigment Black 7, 28, or 26; as a white pigment, Pigment White 6, 18, or 21, etc. may be used according to the intended application.

In the present invention, a disperse dye may be used in a range that enables it to be dissolved in a water-immiscible organic solvent. Disperse dyes generally include water-soluble dyes, but in the present invention it is preferable for the disperse dye to be used in a range such that it dissolves in a water-immiscible organic solvent.

Specific preferred examples of the disperse dye include CI Disperse Yellow 5, 42, 54, 64, 79, 82, 83, 93, 99, 100, 119, 122, 124, 126, 160, 184:1, 186, 198, 199, 201, 204, 224, and 237; CI Disperse Orange 13, 29, 31:1, 33, 49, 54, 55, 66, 73, 118, 119, and 163; CI Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, and 362; CI Disperse Violet 33; CI Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, and 368; and CI Disperse Green 6:1 and 9

It is preferable that the colorant is added to the ink composition and then dispersed in the ink to an appropriate degree. For dispersion of the colorant, for example, a dispersing machine such as a ball mill, a sand mill, an attritor, a roll mill, an agitator, a Henschel mixer, a colloidal mill, an ultrasonic homogenizer, a pearl mill, a wet type jet mill, or a paint shaker may be used.

The colorant may be added directly to the ink composition, but in order to improve dispersibility it may be added in advance to a solvent or a dispersing medium such as a polymerizable compound used in the present invention.

In the present invention, in order to avoid the problem of the solvent resistance being degraded when the solvent remains in the cured image and the VOC (Volatile Organic Compound) problem of the residual solvent, it is preferable to add the colorant in advance to a dispersing medium such as a polymerizable compound. As a polymerizable compound used, it is preferable in terms of dispersion suitability to select a monomer having low viscosity. The colorants may be used by appropriately selecting one type or two or more types according to the intended purpose of the ink composition.

When a colorant such as a pigment that is present as a solid in the ink composition is used, it is preferable for the colorant, the dispersant, the dispersing medium, dispersion conditions, and filtration conditions to be set so that the average particle size of colorant particles is preferably 0.005 to 0.5 µm, more preferably 0.01 to 0.45 µm, and yet more preferably 0.015 to 0.4 µm. By such control of particle size, clogging of a head nozzle can be suppressed, and the ink storage stability, the transparency, and the curing sensitivity can be maintained.

The content of the colorant in the ink composition is appropriately selected according to the color and the intended purpose, and is preferably 0.01 to 30 mass % relative to the mass of the entire ink composition.

(Component D) Photopolymerization Initiator

The ink composition of the present invention comprises (Component D) a photopolymerization initiator.

The photopolymerization initiator is a compound that forms a polymerization-initiating species upon exposure to actinic radiation, and a known photopolymerization initiator may be appropriately selected and used.

The actinic radiation referred to here is not particularly limited as long as it can apply energy that can form an initiating species in an ink composition upon exposure, and includes α-rays, γ-rays, X-rays, UV, IR, visible light, an electron beam, etc. Among them, from the viewpoint of curing sensitivity and ready availability of equipment, UV and an electron beam are preferable, and UV is more preferable. Therefore, the ink composition of the present invention is preferably curable by irradiating it with UV as the actinic radiation. A light source for generating UV is preferably one having a light emission wavelength at 300 nm to 400 nm; a known UV lamp such as a low-pressure mercury lamp, a high-pressure mercury lamp, a short arc discharge lamp, a UV light-emitting diode, a semiconductor laser, or a fluorescent lamp may be used, and according to the light intensity and the wavelength suitable for the initiator, a high pressure mercury lamp or a metal halide lamp, which are classified as high-pressure discharge lamps, or a xenon lamp, which is classified as a short arc discharge lamp, is preferably used. Furthermore, from the viewpoint of energy conservation, a UV light-emitting diode may also preferably be used.

The polymerization initiator in the present invention includes not only a compound absorbing external energy such as actinic radiation to thus form a photopolymerization-initiating species but also a compound (a so-called sensitizer) that absorbs specific actinic radiation to thus promote the decomposition of a photopolymerization initiator.

The photopolymerization initiator is preferably a radical photopolymerization initiator.

Examples of the radical photopolymerization initiator include (a) an aromatic ketone, (b) an acylphosphine compound, (c) an aromatic onium salt compound, (d) an organic peroxide, (e) a thio compound, (f) a hexaarylbiimidazole compound, (g) a ketoxime ester compound, (h) a borate compound, (i) an azinium compound, (j) a metallocene compound, (k) an active ester compound, (l) a compound having a carbon-halogen bond, and (m) an alkylamine compound.

With regard to these radical photopolymerization initiators, the above-mentioned compounds (a) to (m) may be used singly or in combination.

Among them, the aromatic ketone (a), the acylphosphine compound (b), and the thio compound (e) are preferable. Preferred examples of them include a compound having a benzophenone skeleton (benzophenone compound) or a compound having a thioxanthone skeleton (thioxanthone compound) described in 'RADIATION CURING IN POLYMER SCIENCE AND TECHNOLOGY' J. P. FOUASSIER J. F. RABEK (1993), pp. 77 to 117. Preferred include an α-thiobenzophenone compound described in JP-B-47-6416, a benzoin ether compound described in JP-B-47-3981, an α-substituted benzoin compound described in JP-B-47-22326, a benzoin derivative described in JP-B-47-23664, an aroylphosphonic acid ester described in JP-A-57-30704, a dialkoxybenzophenone described in JP-B-60-26483, benzoin ethers described in JP-B-60-26403 and JP-A-62-81345, α-aminobenzophenones described in JP-B-1-34242, U.S. Pat. No. 4,318,791, and EP No. 0284561 A1, p-di(dimethylaminobenzoyl)benzene described in JP-A-2-211452, a thio-substituted aromatic ketone described in JP-A-61-194062, an acylphosphine sulfide described in JP-B-2-9597, an acylphosphine described in JP-B-2-9596, a thioxanthone described in JP-B-63-61950, and a coumarin described in JP-B-59-42864.

In the present invention, the acylphosphine compound is preferably used as the photopolymerization initiator, the acylphosphine oxide compound is more preferably used as the photopolymerization initiator, and a monoacylphosphine oxide compound and a bisacylphosphine oxide compound are yet more preferably used in combination.

Preferred examples of the acylphosphine compound include bis(2,4,6-trimethylbenzoyl)phenylphosphine oxide, bis(2,6-dimethylbenzoyl)phenylphosphine oxide, bis(2,4,6-trimethylbenzoyl)-2-methoxyphenylphosphine oxide, bis(2,6-dimethylbenzoyl)-2-methoxyphenylphosphine oxide, bis(2,4,6-trimethylbenzoyl)-2,4-dimethoxyphenylphosphine oxide, bis(2,6-dimethylbenzoyl)-2,4-dimethoxyphenylphosphine oxide, bis(2,4,6-trimethylbenzoyl)-2,4-dipentyloxyphenylphosphine oxide, bis(2,6-dimethylbenzoyl)-2,4-dipentyloxyphenylphosphine oxide, 2,4,6-trimethylbenzoylethoxyphenylphosphine oxide, 2,6-dimethylbenzoylethoxyphenylphosphine oxide, 2,4,6-trimethylbenzoylmethoxyphenylphosphine oxide, 2,6-dimethylbenzoyl)methoxyphenylphosphine oxide, 2,4,6-trimethylbenzoyl(4-pentyloxyphenyl)phenylphosphine oxide, and 2,6-dimethylbenzoyl(4-pentyloxyphenyl)phenylphosphine oxide.

Among them, bis(2,4,6-trimethylbenzoyl)phenylphosphine oxide, bis(2,6-dimethoxybenzoyl)-2,4,4-trimethylpentylphenylphosphine oxide, and 2,4,6-trimethylbenzoyldiphenylphosphine oxide, etc. are preferable.

Examples of the sensitizer include a polynuclear aromatic compound (e.g. pyrene, perylene, triphenylene), a xanthene (e.g. fluorescein, eosin, erythrosine, rhodamine B, Rose Bengal), a cyanine (e.g. thiacarbocyanine, oxacarbocyanine), a merocyanine (e.g. merocyanine, carbomerocyanine), a thiazine (e.g. thionine, methylene blue, toluidine blue), an acridine (e.g. acridine orange, chloroflavin, acriflavine), an anthraquinone (e.g. anthraquinone), a squarium (e.g. squarium), a coumarin (e.g. 7-diethylamino-4-methylcoumarin), and a thioxanthone (e.g. thioxanthone, 2-isopropylthioxanthone, 4-isopropylthioxanthone).

Among them, the ink composition of the present invention preferably comprises a thioxanthone compound as Component D.

With regard to the sensitizer, one type may be used on its own or two or more types may be used in combination.

The content of the photopolymerization initiator is preferably 1 to 50 mass % relative to the total mass of the ink composition, more preferably 2 to 40 mass %, and yet more preferably 3 to 20 mass %.

(Component E) Monomer Having Viscosity at 25° C. of No Greater than 10 mPa·s

The ink composition of the present invention preferably comprises (Component E) a monomer having a viscosity at 25° C. of no greater than 10 mPa·s, and it is preferable for it to comprise Component E in an amount of at least 30 mass % relative to the total mass of the inkjet ink composition. Due to it comprising Component E, the ink composition has low viscosity, the discharge properties improve, and adhesion and heat resistance also improve.

In the present invention, the method for measuring the viscosity at 25° C. of a polymerizable compound (a monomer, an oligomer, etc.) or an ink composition is not particularly limited, but is preferably a measurement method in accordance with JIS Z8803.

Furthermore, equipment for measuring viscosity is preferably a rotational viscometer, and a B type or E type rotational viscometer is preferably used.

As a specific method for measuring the viscosity at 25° C. of a polymerizable compound and an ink composition, it is preferable to carry out measurement using for example an RE80 model viscometer (Toki Sangyo Co., Ltd.) at a liquid temperature of 25° C. after it has been stabilized by rotating a rotor for 2 min.

Preferred examples of Component E include 2-(2-ethoxyethoxy)ethyl acrylate (viscosity (25° C.): 6 mPa·s), 4-t-butylcyclohexyl acrylate (viscosity (25° C.): 9 mPa·s), 2-phenoxyethyl acrylate (viscosity (25° C.): 10 mPa·s), cyclohexyl acrylate (viscosity (25° C.): 3 mPa·s), 3,3,5-trimethylcyclohexyl acrylate (viscosity (25° C.): 4 mPa·s), tetrahydrofurfuryl acrylate (viscosity (25° C.): 6 mPa·s), isobornyl acrylate (viscosity (25° C.): 9 mPa·s), a mixture of octyl acrylate and decyl acrylate (viscosity (25° C.): 3 mPa·s), hexanediol diacrylate (viscosity (25° C.): 5 to 9 mPa·s), 3-methyl-1,5-pentanediol diacrylate (viscosity (25° C.): 4 to 8 mPa·s), neopentyl glycol diacrylate (viscosity (25° C.): 10 mPa·s), 1,3-butanediol diacrylate (viscosity (25° C.): 9 mPa·s), 1,4-butanediol diacrylate (viscosity (25°

C.): 8 mPa·s), nonanediol diacrylate (viscosity (25° C.): 8 mPa·s), 2-methyl-2-ethyl-1,3-dioxolan-4-yl)methyl acrylate (viscosity (25° C.): 10 mPa·s), 3-ethyl-3-oxetanylmethyl acrylate (viscosity (25° C.): 5 mPa·s), benzyl acrylate (viscosity (25° C.): 4 mPa·s), isooctyl acrylate (viscosity (25° C.): 1 mPa·s), isoamyl acrylate (viscosity (25° C.): 1 to 2 mPa·s), isodecyl acrylate (viscosity (25° C.): 5 mPa·s), lauryl acrylate (viscosity (25° C.): 4 mPa·s), stearyl acrylate (viscosity (25° C.): 10 mPa·s), 3,3,5-trimethylcyclohexyl methacrylate (viscosity (25° C.): 3 mPa·s), diethylene glycol methyl ether methacrylate (viscosity (25° C.): 3 mPa·s), ethoxyglycol methacrylate (viscosity (25° C.): 7 mPa·s), tetrahydrofurfuryl methacrylate (viscosity (25° C.): 5 mPa·s), isodecyl methacrylate (viscosity (25° C.): 5 mPa·s), lauryl methacrylate (viscosity (25° C.): 5 mPa·s), a mixture of dodecyl methacrylate and tetradecyl methacrylate (viscosity (25° C.): 7 mPa·s), 2-phenoxyethyl methacrylate (viscosity (25° C.): 10 mPa·s), isobornyl methacrylate (viscosity (25° C.): 10 mPa·s), and tridecyl methacrylate (viscosity (25° C.): 10 mPa·s).

Component E is preferably a monofunctional (meth) acrylate compound, and more preferably at least one type of compound selected from the group of compounds below.

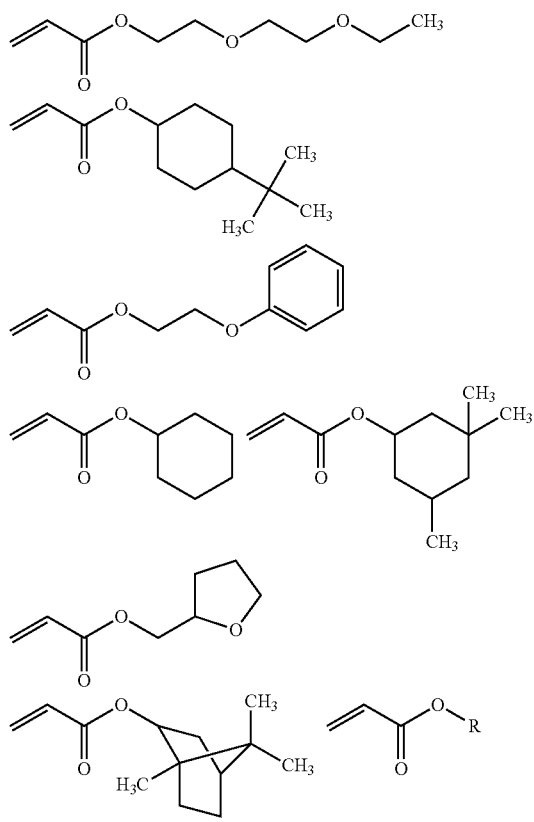

(In the compounds, R denotes an alkyl group having 4 to 18 carbons.)

R above is a straight-chain or branched alkyl group having 4 to 18 carbons, and preferably a straight-chain alkyl group having 4 to 18 carbons.

Yet more preferred examples of Component E include isobornyl acrylate and/or phenoxyethyl acrylate.

With regard to Component E, one type may be used on its own or two or more types may be used in combination.

The total content of Component A and Component E in the ink composition of the present invention is preferably at least 70 mass % of the entire polymerizable compounds, and more preferably at least 80 mass %.

Component E is preferably 10 to 90 mass % of the entire ink composition, more preferably 20 to 80 mass %, and yet more preferably 30 to 75 mass %.

(Component F) Dispersant Other than Component A

The ink composition of the present invention preferably comprises a dispersant other than Component A. As the dispersant other than Component A, a polymeric dispersant is preferable. The 'polymeric dispersant' referred to in the present invention means a dispersant having a weight-average molecular weight of 1,000 or greater.

Examples of the polymeric dispersant other than Component A include polymeric dispersants such as DISPER-BYK-101, DISPERBYK-102, DISPERBYK-103, DISPER-BYK-106, DISPERBYK-111, DISPERBYK-161, DISPERBYK-162, DISPERBYK-163, DISPERBYK-164, DISPERBYK-166, DISPERBYK-167, DISPERBYK-168, DISPERBYK-170, DISPERBYK-171, DISPERBYK-174, and DISPERBYK-182 (manufactured by BYK Chemie), EFKA4010, EFKA4046, EFKA4080, EFKA5010, EFKA5207, EFKA5244, EFKA6745, EFKA6750, EFKA7414, EFKA745, EFKA7462, EFKA7500, EFKA7570, EFKA7575, and EFKA7580 (manufactured by EFKA Additives), Disperse Aid 6, Disperse Aid 8, Disperse Aid 15, and Disperse Aid 9100 (manufactured by San Nopco Limited); various types of SOLSPERSE dispersants such as Solsperse 3000, 5000, 9000, 12000, 13240, 13940, 17000, 22000, 24000, 26000, 28000, 32000, 36000, 39000, 41000, and 71000 (manufactured by Noveon); Adeka Pluronic L31, F38, L42, L44, L61, L64, F68, L72, P95, F77, P84, F87, P94, L101, P103, F108, L121, and P-123 (manufactured by Adeka Corporation), Ionet S-20 (manufactured by Sanyo Chemical Industries, Ltd.), and Disparlon KS-860, 873SN, and 874 (polymeric dispersant), #2150 (aliphatic poly carboxylic acid), and #7004 (polyether ester type) (manufactured by Kusumoto Chemicals, Ltd.).

The content of the dispersant other than Component A in the ink composition of the present invention is appropriately selected according to the intended purpose, and is preferably 0.05 to 15 mass % relative to the mass of the entire ink composition.

(Component G) Polymerizable Compound Other than Component B and Component E

The ink composition of the present invention comprises a polymerizable compound other than Component B and Component E (also called 'the other polymerizable compound').

The other polymerizable compound used in the present invention is preferably a radically polymerizable compound.

The radically polymerizable compound is preferably an ethylenically unsaturated compound, and is preferably a radically polymerizable compound.

The radically polymerizable compound may be any compound as long as it has one radically polymerizable ethylenically unsaturated bond in the molecule, and include chemical configurations such as monomer, oligomer, and polymer. The radically polymerizable compound may be used singly or may be used in a combination of two or more types at any ratio in order to improve desired properties.

Examples of a polymerizable compound having a radically polymerizable ethylenically unsaturated bond include unsaturated carboxylic acids such as acrylic acid, methacrylic acid, itaconic acid, crotonic acid, isocrotonic acid, and maleic acid, and salts thereof, an ethylenically unsaturated group-containing anhydride, acrylonitrile, styrene and, furthermore, radically polymerizable compounds such as various types of unsaturated polyesters, unsaturated polyethers, unsaturated polyamides, and unsaturated urethane.

Examples of the other polymerizable compound include (meth)acrylic acid derivatives such as cyclic trimethylolpropane formal (meth)acrylate, norbornyl (meth)acrylate, 2-hydroxyethyl (meth)acrylate, butoxyethyl (meth)acrylate, carbitol (meth)acrylate, dimethylaminomethyl (meth)acrylate, bis(4-(meth)acryloxypolyethoxyphenyl)propane, diethylene glycol di(meth)acrylate, triethylene glycol di(meth)acrylate, tetraethylene glycol di(meth)acrylate, polyethylene glycol di(meth)acrylate, polypropylene glycol di(meth)acrylate, pentaerythritol tri(meth)acrylate, dipentaerythritol tetra(meth)acrylate, trimethylolethane tri(meth)acrylate, trimethylolpropane tri(meth)acrylate, tetramethylolmethane tetra(meth)acrylate, oligoester (meth)acrylate, 2,2-bis(4-(meth)acryloxypolyrtoxyphenyl)propane, N-methylol (meth)acrylamide, diacetone (meth)acrylamide, and epoxy (meth)acrylate, and allyl compound derivatives such as allyl glycidyl ether, diallyl phthalate, triallyl trimellitate, etc.

Moreover, as a radically polymerizable compound, a vinyl ether compound is preferably used.

More specifically, commercially available or industrially known radically polymerizable or crosslinking monomers, oligomers, and polymers, such as those described in 'Kakyozai Handobukku' (Crosslinking Agent Handbook), Ed. S. Yamashita (Taiseisha, 1981); 'UV/EB Koka Handobukku (Genryo)' (UV/EB Curing Handbook (Starting Materials)) Ed. K. Kato (Kobunshi Kankoukai, 1985); 'UV/EB Koka Gijutsu no Oyo to Shijyo' (Application and Market of UV/EB Curing Technology), p. 79, Ed. RadTech (CMC, 1989); and E. Takiyama 'Poriesuteru Jushi Handobukku' (Polyester Resin Handbook), (The Nikkan Kogyo Shimbun Ltd., 1988) may be used.

The molecular weight of the radically polymerizable compound is preferably 80 to 2,000, more preferably 80 to 1,000, and yet more preferably 80 to 800.

The ink composition preferably comprises an oligomer having a radically polymerizable group. The radically polymerizable group is preferably an ethylenically unsaturated group, and more preferably a (meth)acryloxy group.

Examples of the oligomer having a radically polymerizable group include an olefin-based oligomer (an ethylene oligomer, a propylene oligomer, a butene oligomer, etc.), a vinyl-based oligomer (a styrene oligomer, a vinyl alcohol oligomer, a vinylpyrrolidone oligomer, an acrylate oligomer, a methacrylate oligomer, etc.), a diene-based oligomer (a butadiene oligomer, a chloroprene rubber, a pentadiene oligomer, etc.), a ring-opening polymerization type oligomer (di-, tri-, tetra-ethylene glycol, polyethylene glycol, polyethylimine, etc.), an addition-polymerization type oligomer (an oligoester acrylate, a polyamide oligomer, a polyisocyanate oligomer), and an addition-condensation oligomer (a phenolic resin, an amino resin, a xylene resin, a ketone resin, etc.). Among them an oligoester (meth)acrylate is preferable, and among them a urethane (meth)acrylate, a polyester (meth)acrylate, and an epoxy (meth)acrylate are preferable, and a urethane (meth)acrylate is more preferable.

As the urethane (meth)acrylate, an aliphatic urethane (meth)acrylate and an aromatic urethane (meth)acrylate may preferably be cited, and an aliphatic urethane (meth)acrylate may more preferably be cited.

Furthermore, the urethane (meth)acrylate is preferably a tetra- or lower-functional urethane (meth)acrylate, and more preferably a di- or lower-functional urethane (meth)acrylate.

In accordance with a urethane (meth)acrylate being contained, an ink having excellent adhesion to a substrate and excellent curability is obtained.

With respect to the oligomer, 'Origomar Handobukku (Oligomer Handbook)' (edited by Junji Furukawa, The Chemical Daily Co., Ltd.) may also be referred to.

As oligomer commercial products, examples of urethane (meth)acrylates include R1204, R1211, R1213, R1217, R1218, R1301, R1302, R1303, R1304, R1306, R1308, R1901, and R1150 manufactured by Dai-Ichi Kogyo Seiyaku Co., Ltd., the EBECRYL series (e.g. EBECRYL 230, 270, 4858, 8402, 8804, 8807, 8803, 9260, 1290, 1290K, 5129, 4842, 8210, 210, 4827, 6700, 4450, and 220) manufactured by Daicel-Cytec Company Ltd., NK Oligo U-4HA, U-6HA, U-15HA, U-108A, and U200AX manufactured by Shin-Nakamura Chemical Co., Land td., Aronix M-1100, M-1200, M-1210, M-1310, M-1600, and M-1960 manufactured by Toagosei Co. Ltd.

Examples of polyester (meth)acrylates include the EBECRYL series (e.g. EBECRY L770, IRR467, 81, 84, 83, 80, 675, 800, 810, 812, 1657, 1810, IRR302, 450, 670, 830, 870, 1830, 1870, 2870, IRR267, 813, IRR483, 811, etc.) manufactured by Daicel-Cytec Company Ltd., and Aronix M-6100, M-6200, M-6250, M-6500, M-7100, M-8030, M-8060, M-8100, M-8530, M-8560, and M-9050 manufactured by Toagosei Co., Ltd.

Examples of epoxy (meth)acrylates include the EBECRYL series (e.g. EBECRYL 600, 860, 2958, 3411, 3600, 3605, 3700, 3701, 3703, 3702, 3708, RDX63182, 6040, etc.) manufactured by Daicel-Cytec Company Ltd.

With regard to the oligomer having a radically polymerizable group, one type thereof may be used on its own or two or more types may be used in combination.

The content of the oligomer having a radically polymerizable group is, relative to the mass of the entire ink composition, preferably 0.1 to 50 mass %, more preferably 0.5 to 20 mass %, and yet more preferably 1 to 10 mass %.

With regard to the other polymerizable compound, the other polymerizable compound may not be used, one type thereof may be used on its own or two or more types may be used in combination.

The content of the other polymerizable compound in the ink composition of the present invention is, relative to the mass of the entire ink composition, preferably no more than 30 mass %, more preferably no more than 20 mass %, and yet more preferably no more than 10 mass %.

(Component H) Surfactant

The ink composition of the present invention may comprise a surfactant in order to provide stable discharge properties for a long period of time.

As the surfactant, those described in JP-A-62-173463 and JP-A-62-183457 can be cited. Examples thereof include anionic surfactants such as dialkylsulfosuccinic acid salts, alkylnaphthalene sulfonic acid salts, and fatty acid salts; nonionic surfactants such as polyoxyethylene alkyl ethers, polyoxyethylene alkyl aryl ethers, acetylene glycols, polyoxyethylene/polyoxypropylene block copolymers, and silicone oil; and cationic surfactants such as alkylamine salts and quaternary ammonium salts. An organofluoro compound may be used instead of the above-mentioned surfactant. The organofluoro compound is preferably hydrophobic. Examples of the organofluoro compound include fluorine-based surfactants, oil-like fluorine-based compounds (e.g. fluorine oil), solid fluorine compound resins (e.g. tetrafluoroethylene resin), and those described in JP-B-57-9053 (paragraphs 8 to 17) and JP-A-62-135826.

The content of the surfactant in the ink composition of the present invention is appropriately adjusted according to the intended application, and is preferably 0.0001 to 1 mass % relative to the mass of the entire ink composition.

<Other Components>

The ink composition of the present invention may comprise as necessary, in addition to the above-mentioned components, a UV absorber, an antioxidant, an antifading agent, a conductive salt, a solvent, a polymer compound, a basic compound, etc. They are described in JP-A-2009-221416 and may be used in the present invention as well.

Furthermore, the ink composition of the present invention preferably comprises a polymerization inhibitor from the viewpoint of storage stability and suppression of head clogging.

The content of the polymerization inhibitor is preferably 200 to 20,000 ppm relative to the total mass of the ink composition of the present invention.

Examples of the polymerization inhibitor include a nitroso-based polymerization inhibitor, a hindered amine-based polymerization inhibitor, hydroquinone, benzoquinone, p-methoxyphenol, TEMPO (2,2,6,6-tetramethylpiperidinyloxy), OH-TEMPO (4-hydroxy-2,2,6,6-tetramethylpiperidinyloxy), Al cupferron (tris(N-nitroso-N-phenylhydroxylamine) aluminum salt), 2-(2-hydroxy-5-methylphenyl)benzotriazole, and 2-hydroxy-4-methoxy-5-sulfobenzophenone. Among them, as a polymerization inhibitor, OH-TEMPO and/or Al cupferron can be cited preferably, and OH-TEMPO and Al cupferron can be cited more preferably.

<Ink Physical Properties>

The ink composition preferably has a viscosity at 25° C. of no greater than 40 mPa·s while taking into consideration discharge properties. It is more preferably 5 to 40 mPa·s, and yet more preferably 7 to 30 mPa·s. Furthermore, the viscosity at the discharge temperature (preferably 25° C. to 80° C., and more preferably 25° C. to 50° C.) is preferably 3 to 15 mPa·s, and more preferably 3 to 13 mPa·s. It is preferable to appropriately adjust the compositional ratio of the ink composition so that the viscosity is in the above range. It is preferable to set the viscosity at room temperature so as to be high since the ink can be prevented from penetrating into a recording medium even when a porous recording medium (support) is used, thereby reducing uncured monomer. Furthermore, spreading of the ink when ink droplets have been fired and have landed can be suppressed, and as a result image quality is improved, which is preferable.

The surface tension of the ink composition of the present invention at 25° C. is preferably 28 to 37.5 mN/m, more preferably 31 to 37.5 mN/m, yet more preferably 32 to 37.0 mN/m, particularly preferable 32.5 to 36.8 mN/m, and most preferably 33.0 to 36.5 mN/m.

When in the above range, a printed material having excellent surface gloss is obtained.

As a method for measuring surface tension at 25° C. of the ink composition, a known method may be used, but it is preferable to carry out measurement by a suspended ring method or the Wilhelmy method. Preferred examples include a method using a CBVP-Z automated surface tensiometer manufactured by Kyowa Interface Science Co., Ltd. and a method using a SIGMA 702 manufactured by KSV INSTRUMENTS LTD.

2. Inkjet Recording Method, Inkjet Recording Device, and Printed Material

The inkjet recording method of the present invention is a method for forming an image by discharging the ink composition of the present invention onto a recording medium (support, recording material, etc.) for inkjet recording and curing the ink composition by irradiating the ink composition so discharged onto the recording medium with actinic radiation.

More specifically, the inkjet recording method of the present invention preferably comprises (a[1]) a step of discharging the ink composition of the present invention onto a recording medium, and (b[1]) a step of curing the ink composition by irradiating the discharged ink composition with actinic radiation.

Due to the inkjet recording method of the present invention comprising steps (a[1]) and (b[1]) above, an image is formed by the ink composition cured on the recording medium.

Furthermore, the inkjet recording method of the present invention is preferably carried out in a multipass mode in which the steps (a[1]) and (b[1]) are carried out two or more times in the same area above the recording medium, that is, printing is carried out by overlaying the same area. Due to the use of the ink composition of the present invention, when printing is carried out in a multipass mode, an image having excellent surface gloss is obtained.

Furthermore, the printed material of the present invention is a printed material recorded by the inkjet recording method of the present invention.

In the step (a[1]) and a step (a), which is described later, in the inkjet recording method of the present invention, an inkjet recording device described in detail below may be used.

<Inkjet Recording Device>

The inkjet recording device used in the inkjet recording method of the present invention is not particularly limited, and any known inkjet recording device that can achieve an intended resolution may be used. That is, any known inkjet recording device, such as a commercial product, may be selected and used in order to discharge an ink composition onto the recording medium in the step (a[1]) and the step (a) of the inkjet recording method of the present invention.

The inkjet recording device that can be used in the present invention is equipped with, for example, an ink supply system, a temperature sensor, and an actinic radiation source.

The ink supply system comprises, for example, a main tank containing the ink composition of the present invention, a supply pipe, an ink composition supply tank immediately before an inkjet head, a filter, and a piezo system inkjet head. The piezo system inkjet head may be driven so as to discharge a multisize dot of preferably 1 to 100 pL, and more preferably 8 to 30 pL, at a resolution of preferably 320×320 to 4,000×4,000 dpi (dots per inch), more preferably 400×400 to 1,600×1,600 dpi, and yet more preferably 720×720 dpi. Here, dpi referred to in the present invention means the number of dots per 2.54 cm.

As described above, since it is desirable for the inks of each color to be discharged at a constant temperature, the inkjet recording device is preferably equipped with a temperature stabilizer for stabilizing the temperature of the inks. Parts to be controlled to a constant temperature include all of the supply pipe system and the members from the ink tank (including an intermediate tank if it is provided) to the discharging face of the nozzle. A section from the ink supply tank to the inkjet head is thermally insulated and heated.

A method of controlling temperature is not particularly limited, but it is preferable to provide, for example, temperature sensors at a plurality of pipe section positions, and control heating according to the ink flow rate and the temperature of the surroundings. The temperature sensors may be provided on the ink composition supply tank and in the vicinity of the inkjet head nozzle. Furthermore, the head unit that is to be heated is preferably thermally shielded or insulated so that the device main body is not influenced by the temperature of the outside air. In order to reduce the printer start-up time required for heating, or in order to reduce the thermal energy loss, it is preferable to thermally insulate the head unit from other sections and also to reduce the heat capacity of the entire heated unit.

When the ink composition or the inkjet recording ink composition of the present invention is discharged using the above mentioned inkjet recording device, the ink composition is preferably discharged after being heated to preferably 25° C. to 80° C., and more preferably 25° C. to 50° C., so as to reduce the viscosity of the ink composition to preferably 3 to 15 mPa·s, and more preferably 3 to 13 mPa·s. In particular, it is preferable to use an ink composition having an ink viscosity at 25° C. of no greater than 50 mP·s as the ink composition of the present invention since discharging can be carried out well. By employing this method, high discharge stability can be realized.

The radiation curing type ink composition such as the ink composition of the present invention generally has a viscosity that is higher than that of a normal ink composition or a water-based ink composition used for an inkjet recording ink composition, and variation in viscosity due to a change in temperature at the time of discharge is large. Viscosity variation in the ink composition has a large effect on changes in liquid droplet size and changes in liquid droplet discharge speed and, consequently, causes the image quality to be degraded. It is therefore necessary to maintain the ink composition discharge temperature as constant as possible. In the present invention, the control range for the temperature of ink composition is preferably ±5° C. of a set temperature, more preferably ±2° C. of the set temperature, and yet more preferably ±1° C. of the set temperature.

Subsequently, the step $(b^1)$ and a step (b), which is described later, are explained.

The ink composition discharged onto the recording medium cures upon exposure to actinic radiation. This is due to an initiating species such as a radical being generated by decomposition of the photopolymerization initiator contained in the ink composition of the present invention by irradiation with actinic radiation, the initiating species functioning so as to make a polymerization reaction of a polymerizable compound take place and to promote it. In this process, if a sensitizer is present together with the polymerization initiator in the ink composition, the sensitizer in the system absorbs actinic radiation, becomes excited, and promotes decomposition of the polymerization initiator by contact with the polymerization initiator, thus enabling a curing reaction with higher sensitivity to be achieved.

The actinic radiation used in this process may include α rays, γ rays, an electron beam, X rays, UV rays, visible light, and IR rays. Although it depends on the absorption characteristics of the sensitizer, the peak wavelength of the actinic radiation is preferably 200 to 600 nm, more preferably 300 to 450 nm, yet more preferably 320 to 420 nm, and particularly preferably UV rays having a peak wave length of 340 to 400 nm.

Furthermore, in the present invention, the polymerization initiation system has sufficient sensitivity for low output actinic radiation. The actinic radiation for curing is applied therefore so that the illumination intensity on the exposed surface is preferably 10 to 4,000 mW/cm², and more preferably 20 to 2,500 mW/cm².

As an actinic radiation source, a mercury lamp, a gas/solid laser, etc. are mainly used, and for UV photocuring inkjet ink composition a mercury lamp and a metal halide lamp are widely known. However, from the viewpoint of protection of the environment, there has recently been a strong desire for mercury not to be used, and replacement by a GaN semiconductor UV light emitting device is very useful from industrial and environmental viewpoints. Furthermore, LEDs (UV-LED) and LDs (UV-LD) have small dimensions, long life, high efficiency, and low cost, and their use as a photocuring inkjet light source can be expected.

Furthermore, light-emitting diodes (LED) and laser diodes (LD) may be used as the source of actinic radiation. In particular, when a UV ray source is needed, a UV-LED or a UV-LD may be used. For example, Nichia Corporation has marketed a violet LED having a wavelength of the main emission spectrum of between 365 nm and 420 nm. Furthermore, when a shorter wavelength is needed, U.S. Pat. No. 6,084,250 discloses a LED that can emit actinic radiation whose wavelength is centered between 300 nm and 370 nm. Furthermore, another violet LED is available, and irradiation can be carried out with radiation of a different UV bandwidth. The actinic radiation source in the present invention is preferably a UV-LED, and a UV-LED having a peak wavelength at 340 to 400 nm is particularly preferable.

The maximum illumination intensity of the LED on a recording medium is preferably 10 to 2,000 mW/cm², more preferably 20 to 1,000 mW/cm², and particularly preferably 50 to 800 mW/cm².

The ink composition of the present invention is desirably exposed to such actinic radiation for preferably 0.01 to 120 sec., and more preferably 0.1 to 90 sec.

Irradiation conditions and a basic method for irradiation with actinic radiation are disclosed in JP-A-60-132767. Specifically, a light source is provided on either side of a head unit that includes an ink composition discharge device, and the head unit and the light source are made to scan by a so-called shuttle system. Irradiation with actinic radiation is carried out after a certain time (preferably 0.01 to 0.5 sec., more preferably 0.01 to 0.3 sec., and yet more preferably 0.01 to 0.15 sec.) has elapsed from when the ink composition has landed. By controlling the time from ink composition landing to irradiation so as to be a minimum in this way, it becomes possible to prevent the ink composition that has landed on a recording medium from spreading before being cured. Furthermore, since the ink composition can be exposed before it reaches a deep area of a porous recording medium that the light source cannot reach, it is possible to prevent monomer from remaining unreacted.

Furthermore, curing may be completed using another light source that is not driven. WO99/54415 discloses, as an irradiation method, a method employing an optical fiber and a method in which a collimated light source is incident on a mirror surface provided on a head unit side face, and a recorded area is irradiated with UV light. Such curing methods may be also applied to the inkjet recording method of the present invention.

By employing such a inkjet recording method as described above, it is possible to maintain a uniform dot diameter for landed ink composition even for various types of recording medium (support) having different surface wettability, thereby improving the image quality. In order to obtain a color image, it is preferable to superimpose colors in order from those with a high lightness. By superimposing ink compositions in order from one with high lightness, it is easy for radiation to reach a lower ink composition, the curing sensitivity is good, the amount of residual monomer decreases, and an improvement in adhesion can be expected. Furthermore, although it is possible to discharge all colors and then expose them at the same time, it is preferable to expose one color at a time from the viewpoint of promoting curing.

In this way the ink composition of the present invention may be cured by irradiation with actinic radiation in high sensitivity and form an image on the surface of the recording medium.

The inkjet recording method of the present invention may suitably employ the ink set of the present invention. The order in which colored ink compositions are discharged is not particularly limited, but it is preferable to apply to a recording medium from an ink composition having a high lightness; when the ink compositions of yellow, cyan, magenta, and black are used, they are preferably applied on top of the recording medium in the order yellow→cyan→magenta→black. Furthermore, when white is additionally used, they are preferably applied on top of the recording medium in the order white→yellow→cyan→magenta→black. Moreover, the present invention is not limited thereto, and an ink set comprising a total of seven colors, that is, light cyan, light magenta ink compositions and cyan, magenta, black, white, and yellow dark ink compositions may preferably be used, and in this case they are applied on top of the recording medium in the order white→light cyan→light magenta→yellow→cyan→magenta→black.

When the ink set of the present invention is used for molding, which is described later, it is preferable that an ink composition that is usually positioned on the uppermost surface, which is the most likely to be in contact with a mold, is the ink composition of the present invention, and it is more preferable that an ink composition that is positioned on the outermost surface, which is in contact with a mold, is the ink composition of the present invention.

In the present invention, the recording medium is not particularly limited, and a recording medium known as a support and a recording material may be used. Examples thereof include paper, paper laminated with a plastic (e.g. polyethylene, polypropylene, polystyrene, etc.), a metal plate (e.g. aluminum, zinc, copper, etc.), a plastic film (e.g. cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinylacetal, polyvinyl chloride (PVC), acrylic resin, etc.), and paper or plastic film laminated or vapor-deposited with the above metal (e.g. an aluminum composite plate, etc.). In the present invention, as the recording medium, a non-absorbing recording medium may suitably be used.

The recording medium is preferably a transparent recording medium, and more preferably a transparent polymer film or sheet.

The ink composition of the present invention is suitable for production of a decorative sheet, and in this case an inkjet recording method comprising the steps below in the order shown is preferable.

A step of discharging the radiation-curable ink composition of the present invention onto a substrate by an inkjet method (step a), and a step of irradiating the discharged ink composition with actinic radiation to thus produce a decorative sheet (step b).

The decorative sheet comprises a cured image layer being formed by curing the ink composition of the present invention.

Furthermore, it is also preferable to produce a decorative sheet molded product by subjecting the decorative sheet to a step involving molding, and preferably vacuum forming, pressure forming, or vacuum/pressure forming.

It is also preferable that the decorative sheet molded product is subjected to hole making and/or cutting.

In particular, since the image layer obtained using the ink composition of the present invention is excellent in terms of stretchability and heat resistance, even when it is subjected to vacuum forming, pressure forming, or vacuum/pressure forming, image drop-outs, cracking, etc. are suppressed. Furthermore, the occurrence of cracking of the image during hole making and/or cutting is also suppressed.

<Vacuum Forming, Pressure Forming, and Vacuum/Pressure Forming>

Vacuum forming is a method in which a support having an image formed thereon is preheated to a temperature at which it can be thermally deformed, and molding is carried out by pressing it against a mold and cooling while sucking it toward the mold by means of a vacuum and stretching it. It is preferable to use a convex mold and a concave mold in combination in vacuum forming.

Pressure forming is a method in which a support having an image formed thereon is preheated to a temperature at which it can be thermally deformed, and molding is carried out by pressing it against a mold by applying pressure from the side opposite to the mold and cooling.

Vacuum/pressure forming is a method in which molding is carried out by applying a vacuum and pressure at the same time.

Details may be referred to in the 'Thermal Forming' section on p. 766 to 768 of 'Koubunshi Daijiten' (Polymer Dictionary) (Maruzen Co., Ltd.) and literature referred to in this section.

The forming temperature may be determined as appropriate according to the type of support and the support, but it is preferable to carry out forming at a support temperature of 60° C. to 180° C., more preferably 80° C. to 160° C., and yet more preferably 80° C. to 150° C. When in this range, forming is carried out with little change in image color and excellent mold release.

The ink composition of the present invention is particularly preferably for an in-mold molded.

The in-mold molded article of the present invention is an in-mold molded article obtained using the decorative sheet of the present invention or the decorative sheet molded product of the present invention.

In the present invention, the process for producing an in-mold molded article more preferably comprises (step 1) a step of placing a molded printed material on an inner wall of a cavity formed by a plurality of molds, and (step 2) a step of injecting a molten resin into the cavity via a gate.

Examples of the step 1 include a step in which a molded printed material is placed within a mold and sandwiched. Specifically, the molded printed material is fed into a mold for molding formed from a plurality of movable and fixed molds, preferably with the image layer on the inside. In this process, a plurality of sheets of molded printed material may be fed one by one, or a required portion of a long molded printed material may be fed intermittently.

When the sheet is placed within a mold, (i) it is placed by simply heating a mold and carrying out suction by evacuating the mold to give intimate contact, or (ii) it is placed by heating and softening from the image layer side using a heated platen, preliminarily molding the sheet so as to make it follow the shape of the interior of the mold, and carrying out mold clamping so that there is intimate contact with an inner face of the mold. The heating temperature in (ii) is preferably at least around the glass transition temperature of a substrate film but less than the melting temperature (or melting point), and it is more preferably a temperature around the glass transition temperature. Around the glass transition temperature means a range of on the order of ±5° C. of the glass transition temperature, and is preferably on the order of 70° C. to 130° C. In the case of (ii), for the purpose of putting the decorative sheet into intimate contact with the mold surface, when heating and softening the sheet using a heated platen, suction by evacuating may be carried out.

In the present invention, a decorative sheet molded product that had been molded may be placed within a mold.

The step 2 is an injection step in which a molten resin is injected into the cavity (hollow part) and cooled and solidified to thus laminate and integrate a resin molding and the molded printed material. When the injection resin is a thermoplastic resin, it is put into a fluid state by heating and melting, and when the injection resin is a thermosetting resin, an uncured liquid composition is heated as appropriate and injected in a fluid state, and solidified by cooling. This enables the molded printed material to integrate with and stick to the resin molding thus formed, thereby giving an in-mold molded article. The heating temperature for the injection resin depends on the injection resin, but is preferably on the order of 180° C. to 280° C.

Any injection resin may be used in the in-mold molded article as long as it is a thermoplastic resin or thermosetting resin (including a two-component curable resin) that can be injection-molded, and various resins may be used. Examples of such thermoplastic resin materials include a polystyrene-based resin, a polyolefin-based resin, an acrylonitrile-butadiene-styrene copolymer (ABS resin) (including a heat-resistant ABS resin), an acrylonitrile-styrene copolymer (AS resin), an acrylonitrile resin (AN resin), a polyphenylene oxide-based resin, a polycarbonate-based resin, a polyacetal-based resin, an acrylic-based resin, a polyethylene terephthalate-based resin, a polybutylene terephthalate-based resin, a polysulfone-based resin, and a polyphenylene sulfide-based resin. Examples of the thermosetting resin include a two-component reaction-curing type polyurethane-based resin and an epoxy-based resin. These resins may be used singly or as a mixture of two or more types.

In addition to the above steps, it is preferable to have a step of removing from the mold a molding having the resin molding integrated with the molded printed material.

<Hole Making and Cutting (Trimming)>

Trimming is removing an unwanted portion of a decorative sheet molded product by hole making, cutting, etc.

Particularly, when the decorative sheet molded product is obtained by using the inkjet ink composition of the present invention and by subjecting to vacuum forming, the occurrence of cracking in after processing such as cracking and peeling of cured layer in trimming (hole making and cutting, etc.) can be suppressed, even if after vacuum forming.

Hole making is making a hole having any shape such as a pattern or a character in a printed material, etc., and there is punching using a conventionally known press, etc., hole making by means of drilling, and a hole making method by means of a laser. Among them, punching using a press, etc. is a method suitable when large numbers of identical products are made.

Punching using a press, etc. is a method in which a printed material placed on a mold is sheared using a press equipped with a punching blade.

The decorative sheet molded product of the present invention is preferably one that has been subjected to hole making.

Cutting is cutting an unwanted portion, etc. of a decorative sheet molded product, and may be carried out suitably by means of a known press, a guillotine cutter, a laser processor, etc.

When a printed material or decorative sheet molded product produced by using the inkjet ink composition of the present invention is subjected to trimming, it is preferably carried out at a temperature of 20° C. to 150° C., more preferably at a temperature of 20° C. to 100° C., and particularly preferably at a temperature of 25° C. to 60° C. When in this range, change in color of the image is suppressed, and release from a mold is excellent.

In accordance with the present invention, there can be provided an inkjet ink composition that is excellent in terms of storage stability, inkjet discharge stability, and curability and gives an image having excellent stretchability at high temperature, and an inkjet recording method, ink set, decorative sheet, decorative sheet molded product, a process for producing an in-mold molded article, and in-mold molded article that employ the inkjet ink composition.

EXAMPLES

The present invention is explained more specifically below by reference to Examples and Comparative Examples. However, the present invention should not be construed as being limited by these Examples. 'Parts' in the description below denotes 'parts by mass' and '%' denotes 'mass %' unless otherwise specified.

The compounds used in the present Examples are listed below.

<Pigments>
CINQUASIA MAGENTA RT-355D (magenta pigment, quinacridone pigment, mixed crystals of C.I. Pigment Violet 19 and C.I. Pigment Red 202, BASF Japan)
IRGALITTE BLUE GLVO (cyan pigment, C.I. Pigment Blue 15: 4, BASF Japan)
NOVOPERM YELLOW H2G (yellow pigment, C.I. Pigment Yellow 120, Clariant)
SPECIAL BLACK 250 (black pigment, C.I. Pigment Black 7, BASF Japan)
Tipaque CR60-2 (white pigment, Ishihara Sangyo Kaisha Ltd.)
<Dispersants>
BYK JET9150 (maleimide-styrene copolymer having ammonium salt structure, BYK-CHEMIE GMBH)
BYK JET9151 (maleimide-styrene copolymer having ammonium salt structure, BYK-CHEMIE GMBH)
SOLSPERSE 36000 (pigment dispersing agent other than Component A, The Lubrizol Corporation)
SOLSPERSE 32000 (pigment dispersing agent other than Component A, The Lubrizol Corporation)
SOLSPERSE 2000 (pigment dispersing agent other than Component A, The Lubrizol Corporation)
SOLSPERSE 5000 (pigment dispersing agent other than Component A, The Lubrizol Corporation)
SOLSPERSE 41000 (pigment dispersing agent other than Component A, The Lubrizol Corporation)
Synthetic dispersants D-1 to D-24 (synthetic products, copolymers described in Table 1 or Table 2)
Synthesis of D-4
Styrene (Aldrich) (39 g, 375 mmol), maleic anhydride (Aldrich) (12.3 g, 125 mmol), and AIBN (Aldrich) (3.2 g, 20 mmol) were added to 300 g of methoxypropyl acetate (Aldrich) and stirring was carried out at 140° C. for 1 hour.

Subsequently, methoxypropyl acetate was removed, thus giving 47 g of styrene-maleic anhydride copolymer 1.

2-Aminoethanol (Aldrich) (9.2 g, 150 mmol) and sodium hydride (Aldrich) (3.6 g, 150 mmol) were added to tetrahydrofuran (THF), stirring was carried out at 50° C. for 5 hours, ethylene oxide (Aldrich) (300 mmol) was added thereto, and stirring was carried out at room temperature (25° C.) for 5 hours, thus giving 17.9 g of an alkylene oxide group-containing amine in a yield of 80%.

The alkylene oxide group-containing amine thus obtained was defined as amine 1.

Styrene-maleic anhydride copolymer 1 (30 g) obtained above, N,N-dimethylethylenediamine (Aldrich) (0.81 g), and amine 1 (12.3 g) were added to 100 g of methoxypropyl acetate, and stirring was carried out at 150° C. for 8 hours, thus giving styrene-maleimide copolymer 1.

Iodomethane (Aldrich) (1.3 g) was added to styrene-maleimide copolymer 1 above, and stirring was carried out at 50° C. for 3 hours, thus giving the target styrene-maleimide copolymer D-4 having an ammonium salt structure in a yield of 65%.

The weight-average molecular weight (Mw) of styrene-maleimide copolymer D-4 having an ammonium salt structure was 5,000.

Synthesis of D-1 to D-3 and D-5 to D-24

D-1 to D-3 and D-5 to D-24 were synthesized in the same manner as in the synthesis of D-4 except that the type of starting materials and amount used were changed as in Table 1. D-1 to D-3 and D-5 to D-24 thus obtained were copolymers in which the maleic anhydride structures were completely converted into the respective maleimide structures shown in Table 1 or Table 2 as for D-4.

TABLE 1

| Styrene-maleimide copolymer | Styrene | Maleimide having EO chain | Maleimide having an ammonium salt structure | Ratio (Molar ratio) | | | Mw (× 1,000) |
| --- | --- | --- | --- | --- | --- | --- | --- |
| | | | | Styrene | Maleimide having EO chain | Maleimide having an ammonium salt structure | |
| D-1 | [styrene] | [maleimide with -CH2CH2-O-CH2CH2-O-CH2CH2-OH] | [maleimide with -CH2CH2-N+(CH3)2- , I−] | 99.00 | 0.99 | 0.01 | 5 |
| D-2 | [styrene] | [maleimide with -CH2CH2-O-CH2CH2-O-CH2CH2-OH] | [maleimide with -CH2CH2-N+(CH3)2- , I−] | 99.00 | 0.50 | 0.50 | 5 |
| D-3 | [styrene] | [maleimide with -CH2CH2-O-CH2CH2-O-CH2CH2-OH] | [maleimide with -CH2CH2-N+(CH3)2- , I−] | 99.00 | 0.01 | 0.99 | 5 |
| D-4 | [styrene] | [maleimide with -CH2CH2-O-CH2CH2-O-CH2CH2-OH] | [maleimide with -CH2CH2-N+(CH3)2- , I−] | 75.00 | 24.75 | 0.25 | 5 |

TABLE 1-continued

| Styrene-maleimide copolymer | Styrene | Maleimide having EO chain | Maleimide having an ammonium salt structure | Ratio (Molar ratio) | | | Mw (× 1,000) |
| --- | --- | --- | --- | --- | --- | --- | --- |
| | | | | Styrene | Maleimide having EO chain | Maleimide having an ammonium salt structure | |
| D-5 | styrene | maleimide-EO | maleimide-ammonium | 75.00 | 12.50 | 12.50 | 5 |
| D-6 | styrene | maleimide-EO | maleimide-ammonium | 75.00 | 0.25 | 24.75 | 5 |
| D-7 | styrene | maleimide-EO | maleimide-ammonium | 50.00 | 49.50 | 0.50 | 5 |
| D-8 | styrene | maleimide-EO | maleimide-ammonium | 50.00 | 25.00 | 25.00 | 5 |
| D-9 | styrene | maleimide-EO | maleimide-ammonium | 50.00 | 0.50 | 49.50 | 5 |
| D-10 | styrene | maleimide-EO | maleimide-ammonium | 25.00 | 74.25 | 0.75 | 5 |

TABLE 1-continued

| Styrene-maleimide copolymer | Styrene | Maleimide having EO chain | Maleimide having an ammonium salt structure | Ratio (Molar ratio) Styrene | Maleimide having EO chain | Maleimide having an ammonium salt structure | Mw (× 1,000) |
|---|---|---|---|---|---|---|---|
| D-11 | styrene | N-(CH₂CH₂O)₂CH₂CH₂OH maleimide | N,N-dimethyl-N-ethylmaleimide ammonium iodide | 25.00 | 37.50 | 37.50 | 5 |
| D-12 | styrene | N-(CH₂CH₂O)₂CH₂CH₂OH maleimide | N,N-dimethyl-N-ethylmaleimide ammonium iodide | 25.00 | 0.75 | 74.25 | 5 |

TABLE 2

| Styrene-maleimide copolymer | Styrene | Maleimide having EO chain | Maleimide having an ammonium salt structure | Ratio (Molar ratio) Styrene | Maleimide having EO chain | Maleimide having an ammonium salt structure | Mw (× 1,000) |
|---|---|---|---|---|---|---|---|
| D-13 | styrene | N-(CH₂CH₂O)₂CH₂CH₂OH maleimide | N,N-dimethyl-N-ethylmaleimide ammonium iodide | 1.00 | 98.01 | 0.99 | 5 |
| D-14 | styrene | N-(CH₂CH₂O)₂CH₂CH₂OH maleimide | N,N-dimethyl-N-ethylmaleimide ammonium iodide | 1.00 | 49.50 | 49.50 | 5 |
| D-15 | styrene | N-(CH₂CH₂O)₂CH₂CH₂OH maleimide | N,N-dimethyl-N-ethylmaleimide ammonium iodide | 1.00 | 0.99 | 98.01 | 5 |

TABLE 2-continued

| Styrene-maleimide copolymer | Styrene | Maleimide having EO chain | Maleimide having an ammonium salt structure | Ratio (Molar ratio) Styrene | Maleimide having EO chain | Maleimide having an ammonium salt structure | Mw (× 1,000) |
|---|---|---|---|---|---|---|---|
| D-16 | styrene | maleimide-CH₂CH₂-O-CH₂CH₂-O-CH₂CH₂OH | I⁻ ⁺N(CH₃)₂-CH₂CH₂-maleimide | 75.00 | 24.75 | 0.25 | 1.5 |
| D-17 | styrene | maleimide-CH₂CH₂-O-CH₂CH₂-O-CH₂CH₂OH | I⁻ ⁺N(CH₃)₂-CH₂CH₂-maleimide | 75.00 | 24.75 | 0.25 | 10 |
| D-18 | styrene | maleimide-CH₂CH₂-O-CH₂CH₂-O-CH₂CH₂OH | BF₄⁻ ⁺N(CH₃)₂-CH₂CH₂-maleimide | 50.00 | 49.50 | 0.50 | 5 |
| D-19 | styrene | maleimide-CH₂CH₂-O-CH₂CH₂-O-CH₂CH₂OH | PF₆⁻ ⁺N(CH₃)₂-CH₂CH₂-maleimide | 50.00 | 49.50 | 0.50 | 5 |
| D-20 | styrene | maleimide-CH₂CH₂-O-CH₂CH₂OH | I⁻ ⁺N(CH₃)₂-CH₂CH₂-maleimide | 50.00 | 49.50 | 0.50 | 5 |
| D-21 | styrene | maleimide-CH₂-O-CH₂CH₂-O-CH₂CH₂-O-CH₂CH₂-O-CH₂CH₂OH | I⁻ ⁺N(CH₃)₂-CH₂CH₂-maleimide | 50.00 | 49.50 | 0.50 | 5 |

TABLE 2-continued

| Styrene-maleimide copolymer | Styrene | Maleimide having EO chain | Maleimide having an ammonium salt structure | Ratio (Molar ratio) Styrene | Maleimide having EO chain | Maleimide having an ammonium salt structure | Mw (× 1,000) |
|---|---|---|---|---|---|---|---|
| D-22 | | | | 50.00 | 49.50 | 0.50 | 5 |
| D-23 | | | | 50.00 | 49.50 | 0.50 | 5 |
| D-24 | | | | 50.00 | 49.50 | 0.50 | 5 |

Dispersant E for Comparative Examples (synthetic product, copolymer below)

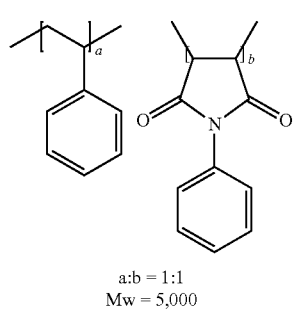

a:b = 1:1
Mw = 5,000

(In the copolymer, a and b denote molar ratio.)
Synthesis of Dispersant E for Comparison
  Dispersant E for Comparative Examples was synthesized in the same manner as for D-4 except that the starting materials were changed accordingly.
<Monomers/Oligomers>
NVC (N-vinylcaprolactam, BASF)
EOEOEA (2-(2-ethoxyethoxy)ethyl acrylate, product name SR256, Sartomer)
CTFA (cyclic trimethylolpropane formal acrylate, product name SR256, Sartomer, viscosity (25° C.): 13 mPa·s)
TBCHA (4-t-butylcyclohexyl acrylate, product name SR217, Sartomer)
PEA (2-phenoxyethyl acrylate, product name EBECRYL 114, Daicel-Cytec Company Ltd.)
CHA (cyclohexyl acrylate, Tokyo Chemical Industry Co., Ltd.)
CD420 (3,3,5-trimethylcyclohexyl acrylate, Sartomer)
THFA (tetrahydrofurfuryl acrylate, product name SR285, Sartomer)
IBOA (isobornyl acrylate, product name SR506, Sartomer)

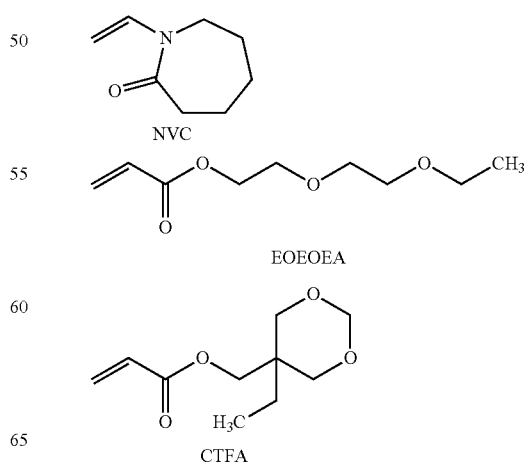

-continued

TBCHA

PEA

CHA    CD420

THFA

IBOA

The viscosities of monomers corresponding to Component E are shown in Table 3 below.

TABLE 3

| Compound Name | Viscosity (25° C.) [mPa · s] |
|---|---|
| EOEOEA | 6 |
| TBCHA | 9 |
| PEA | 10 |
| CHA | 3 |
| CD420 | 4 |
| THFA | 6 |
| IBOA | 9 |

<Photopolymerization Initiators>
TPO (DAROCUR TPO, 2,4,6-trimethylbenzoyldiphenylphosphine oxide, BASF Japan)
Irg819 (IRGACURE 819, bis(2,4,6-trimethylbenzoyl)phenylphosphine oxide, BASF Japan)
ITX (photopolymerization initiator, isopropylthioxanthone, Shell Chemicals Japan)
<Other Components>
CN9031: urethane acrylate oligomer (Sartomer)
OH-TEMPO: 4-hydroxy-2,2,6,6-tetramethylpiperidinyloxy (ADEKA)
UV-12 (FLORSTAB UV12, nitroso-based polymerization inhibitor, tris(N-nitroso-N-phenylhydroxylamine) aluminum salt, Kromachem)
<Preparation of Cyan Mill Base C>
C pigment (cyan pigment): IRGALITE BLUE GLVO (BASF Japan): 30 parts by mass
PEA: 50 parts by mass
SOLSPERSE 32000: 10 parts by mass
SOLSPERSE 5000: 10 parts by mass The above components were stirred, thus giving cyan mill base C. Preparation of the pigment mill base was carried out in an M50 disperser motor mill (Eiger Machinery, Inc.) using zirconia beads having a diameter of 0.65 mm at a peripheral speed of 9 m/s for 8 hours.
<Preparation of Magenta Mill Base M (SOLSPERSE 32000)>
M pigment (magenta pigment): CINQUASIA MAGENTA RT-355D (BASF Japan): 30 parts by mass
PEA: 50 parts by mass
SOLSPERSE 32000: 20 parts by mass The above components were stirred, thus giving magenta mill base M. Preparation of the pigment mill base was carried out in an M50 disperser motor mill (Eiger Machinery, Inc.) using zirconia beads having a diameter of 0.65 mm at a peripheral speed of 9 m/s for 8 hours.
<Preparation of Magenta Mill Base M (BYK JET9151)>
Magenta mill base M (BYK JET9151) was obtained in the same manner as in the preparation of magenta mill base M (SOLSPERSE 32000) above except that SOLSPERSE 32000 was changed to BYK JET9151.
<Preparation of Yellow Mill Base Y>
Y pigment (yellow pigment): NOVOPERM YELLOW H2G (Clariant): 30 parts by mass
PEA: 50 parts by mass
SOLSPERSE 2000: 20 parts by mass The above components were stirred, thus giving yellow mill base Y. Preparation of the pigment mill base was carried out in an M50 disperser motor mill (Eiger Machinery, Inc.) using zirconia beads having a diameter of 0.65 mm at a peripheral speed of 9 m/s for 8 hours.
<Preparation of Black Mill Base K>
K pigment (black pigment): SPECIAL BLACK 250 (BASF Japan): 30 parts by mass
PEA: 50 parts by mass
SOLSPERSE 32000: 20 parts by mass The above components were stirred, thus giving black mill base K. Preparation of the pigment mill base was carried out in an M50 disperser motor mill (Eiger Machinery, Inc.) using zirconia beads having a diameter of 0.65 mm at a peripheral speed of 9 m/s for 8 hours.
<Preparation of White Mill Base W>
W pigment (white pigment): KRONOS 2300 (white pigment, KRONOS): 50 parts by mass
PEA: 45 parts by mass
SOLSPERSE 41000: 5 parts by mass The above components were stirred, thus giving white mill base W. Preparation of the pigment mill base was carried out in an M50 disperser motor mill (Eiger Machinery, Inc.) using zirconia beads having a diameter of 0.65 mm at a peripheral speed of 9 m/s for 8 hours.

Examples 1 to 49 and Comparative Examples 1 to 7

<Preparation of Ink Compositions>
Ink compositions were obtained by mixing Component A, Component B, Component D, the respective mill base, and other additives in the formulations shown in Table 4 to Table 6 and stirring at high speed.
<Inkjet Recording Method>
Recording was carried out on a recording medium using an inkjet recording system having piezo type inkjet nozzles. The ink supply system comprised a main tank, a supply pipe, an ink supply tank immediately before an inkjet head, a filter, and a piezo type inkjet head, and a section from the ink supply tank to the inkjet head was thermally insulated and heated. Temperature sensors were provided on the ink supply tank and in the vicinity of the nozzle of the inkjet head, and the temperature was controlled so that the nozzle section was always at 45° C.±2° C. The piezo type inkjet head was driven so as to discharge multisize dots of 1 to 60 pL at a resolution of 1,200×1,200 dpi. The exposure system, the main scanning speed, and the discharge frequency were adjusted so that, after landing, UV light was focused to give an exposure area illumination intensity of 1,200 mW/cm$^2$, and irradiation started 0.1 sec. after the ink composition landed on the recording medium. The exposure time was variable, and exposure energy was applied. The UV lamp employed an LED lamp (manufactured by GS Yuasa Corporation). Here, the dpi referred to in the present invention denotes the number of dots per 2.54 cm. The recording medium employed a polycarbonate substrate (film thickness 400 μm, Teijin Chemicals Ltd., product name: Panlite).

Since an image was formed by reciprocating the head five times, the ink that had been fired first was irradiated with an exposure corresponding to the five reciprocations. The exposure for one reciprocation was about 100 mJ/cm$^2$, and the total exposure when reciprocated five times was 500 mJ/cm$^2$. The evaluation of curability described below was carried out by controlling the number of reciprocations.

Evaluation Method

Storage Stability

An ink composition that had been obtained was stored at 60° C. for 4 weeks, and the percentage increase in average particle size and viscosity after storage compared with that before storage was used for evaluation.

Measurement of average particle size was carried out using a particle size analyzer (FPAR, Otsuka Electronics Co., Ltd.).

Measurement of viscosity was carried out using an E type viscometer (Toki Sangyo Co., Ltd.).

The evaluation criteria were as follows.
5: the two requirements (viscosity, particle size) were both no greater than 110%
4: either one of the two requirements (viscosity, particle size) exceeded 110% but was no greater than 120%
3: either one of the two requirements (viscosity, particle size) exceeded 120% but was no greater than 140%
2: either one of the two requirements (viscosity, particle size) exceeded 140% but was no greater than 160%
1: either one of the two requirements (viscosity, particle size) exceeded 160%

An evaluation of up to 3 was an acceptable range in practice.

Discharge Stability

Continuous discharge for 5 minutes in 1,200 dpi mode was carried out a total of six times using the inkjet recording equipment described in the inkjet recording method section, and an evaluation was carried out using the number of missing nozzles. The evaluation criteria were as follows.
5: no missing nozzles in all cases
4: one missing nozzle occurred in one run
3: one missing nozzle occurred in two runs
2: one missing nozzle occurred in three runs
1: one missing nozzle occurred in four or more runs or two or more missing nozzles occurred in one run An evaluation of up to 3 was an acceptable range in practice.

Curability

Ink drawing of solid images having an average film thickness of 30 μm was carried out on a transparent substrate (polycarbonate) as a resin sheet using the ink compositions of the Examples and Comparative Examples in accordance with the inkjet recording method, and the ink films were evaluated in terms of transfer after aging at room temperature (25° C.) with a load of 1 kg/A6 size for 1 day. The evaluation criteria were as follows.
5: no transfer
4: there was transfer with an area of 1% to 25% on the transferred substrate side
3: there was transfer with an area of 26% to 50% on the transferred substrate side
2: there was transfer with an area of 51% to 75% on the transferred substrate side
1: there was transfer with an area of 76% to 100% on the transferred substrate side An evaluation of up to 3 was an acceptable range in practice. Measurement of thermal stretching ratio (stretchability at high temperature)

Ink drawing of solid images having an average film thickness of 30 μm was carried out on a transparent substrate (polycarbonate) as a resin sheet using the ink compositions aged at 60° C. for 4 weeks in the Examples and Comparative Examples in accordance with the inkjet recording method, and the ink images were cut to a size of 5 cm×2 cm and subjected to measurement of stretching ratio by pulling using the stretching machine and temperature conditions below.

Equipment used: Tensilon (Shimadzu Corporation)
Conditions: temperature 180° C., pulling speed 50 millimeter/min.

Length at break was measured and the stretching ratio was calculated. The stretching ratio was determined from stretching ratio={(length at break−length before stretching)/length before stretching}×100. For example, when there was break at 10 cm, it was calculated as {(10 cm−5 cm)/5 cm}×100=100% stretch.

The evaluation criteria for thermal stretchability (stretchability at high temperature) were as follows.
5: stretching ratio of at least 200%.
4: stretching ratio of at least 150% but less than 200%.
3: stretching ratio of at least 100% but less than 150%.
2: stretching ratio of at least 70% but less than 100%.
1: stretching ratio of less than 70%.

An evaluation of 5 was the best, and an evaluation of 3 or greater was a range that gave no problems in practice.

TABLE 4

| Example No. | | 1 | 2 | 3 | 4 | 5 | 6 | 7 | 8 | 9 | 10 | 11 | 12 | 13 |
|---|---|---|---|---|---|---|---|---|---|---|---|---|---|---|
| Magenta mill base (SOLSPERSE 32000) | | 15 | 15 | 15 | 15 | 15 | 15 | 15 | 15 | 15 | 15 | 15 | 15 | 15 |
| Monomer | NVC | 10 | 25 | 40 | 25 | 25 | 25 | 25 | 25 | 25 | 25 | 25 | 25 | 25 |
| | IBOA | 38.5 | 23.5 | 8.5 | 23.5 | 23.5 | 23.5 | 23.5 | 23.5 | 23.5 | 23.5 | 23.5 | 23.5 | 23.5 |
| | PEA | 20 | 20 | 20 | 20 | 20 | 20 | 20 | 20 | 20 | 20 | 20 | 20 | 20 |

TABLE 4-continued

| | | 1 | 2 | 3 | 4 | 5 | 6 | 7 | 8 | 9 | 10 | 11 | 12 | 13 |
|---|---|---|---|---|---|---|---|---|---|---|---|---|---|---|
| Oligomer | CN9031 | 4 | 4 | 4 | 4 | 4 | 4 | 4 | 4 | 4 | 4 | 4 | 4 | 4 |
| Photopoly-merization initiator | TPO | 5 | 5 | 5 | 5 | 5 | 5 | 5 | 5 | 5 | 5 | 5 | 5 | 5 |
| | Irg819 | 5 | 5 | 5 | 5 | 5 | 5 | 5 | 5 | 5 | 5 | 5 | 5 | 5 |
| | ITX | 1 | 1 | 1 | 1 | 1 | 1 | 1 | 1 | 1 | 1 | 1 | 1 | 1 |
| Dispersant | BYK JET9150 | — | — | — | 1 | — | — | — | — | — | — | — | — | — |
| | BYK JET9151 | 1 | 1 | 1 | — | — | — | — | — | — | — | — | — | — |
| | D-1 | — | — | — | — | 1 | — | — | — | — | — | — | — | — |
| | D-2 | — | — | — | — | — | 1 | — | — | — | — | — | — | — |
| | D-3 | — | — | — | — | — | — | 1 | — | — | — | — | — | — |
| | D-4 | — | — | — | — | — | — | — | 1 | — | — | — | — | — |
| | D-5 | — | — | — | — | — | — | — | — | 1 | — | — | — | — |
| | D-6 | — | — | — | — | — | — | — | — | — | 1 | — | — | — |
| | D-7 | — | — | — | — | — | — | — | — | — | — | 1 | — | — |
| | D-8 | — | — | — | — | — | — | — | — | — | — | — | 1 | — |
| | D-9 | — | — | — | — | — | — | — | — | — | — | — | — | 1 |
| | D-10 | — | — | — | — | — | — | — | — | — | — | — | — | — |
| | D-11 | — | — | — | — | — | — | — | — | — | — | — | — | — |
| | D-12 | — | — | — | — | — | — | — | — | — | — | — | — | — |
| | D-13 | — | — | — | — | — | — | — | — | — | — | — | — | — |
| | D-14 | — | — | — | — | — | — | — | — | — | — | — | — | — |
| | D-16 | — | — | — | — | — | — | — | — | — | — | — | — | — |
| | D-17 | — | — | — | — | — | — | — | — | — | — | — | — | — |
| | D-18 | — | — | — | — | — | — | — | — | — | — | — | — | — |
| | D-19 | — | — | — | — | — | — | — | — | — | — | — | — | — |
| | D-20 | — | — | — | — | — | — | — | — | — | — | — | — | — |
| | D-21 | — | — | — | — | — | — | — | — | — | — | — | — | — |
| Polymerization inhibitor | OH-TEMPO | 0.3 | 0.3 | 0.3 | 0.3 | 0.3 | 0.3 | 0.3 | 0.3 | 0.3 | 0.3 | 0.3 | 0.3 | 0.3 |
| | UV-12 | 0.2 | 0.2 | 0.2 | 0.2 | 0.2 | 0.2 | 0.2 | 0.2 | 0.2 | 0.2 | 0.2 | 0.2 | 0.2 |
| Total(parts by mass) | | 100 | 100 | 100 | 100 | 100 | 100 | 100 | 100 | 100 | 100 | 100 | 100 | 100 |
| Storage stability | | 5 | 5 | 4 | 5 | 3 | 4 | 3 | 5 | 4 | 3 | 5 | 4 | 3 |
| Discharge stability | | 5 | 5 | 4 | 5 | 5 | 5 | 5 | 5 | 5 | 5 | 5 | 5 | 5 |
| Curability | | 4 | 5 | 5 | 5 | 5 | 5 | 5 | 5 | 5 | 5 | 5 | 5 | 5 |
| Stretchability at high temperature | | 5 | 5 | 5 | 5 | 3 | 4 | 3 | 5 | 4 | 3 | 5 | 4 | 3 |

| Example No. | | 14 | 15 | 16 | 17 | 18 | 19 | 20 | 21 | 22 | 23 | 24 | 25 |
|---|---|---|---|---|---|---|---|---|---|---|---|---|---|
| Magenta mill base (SOLSPERSE 32000) | | 15 | 15 | 15 | 15 | 15 | 15 | 15 | 15 | 15 | 15 | 15 | 15 |
| Monomer | NVC | 25 | 25 | 25 | 25 | 25 | 25 | 25 | 25 | 25 | 25 | 25 | 25 |
| | IBOA | 23.5 | 23.5 | 23.5 | 23.5 | 23.5 | 23.5 | 23.5 | 23.5 | 23.5 | 23.5 | 23.5 | 23.5 |
| | PEA | 20 | 20 | 20 | 20 | 20 | 20 | 20 | 20 | 20 | 20 | 20 | 20 |
| Oligomer | CN9031 | 4 | 4 | 4 | 4 | 4 | 4 | 4 | 4 | 4 | 4 | 4 | 4 |
| Photopoly-merization initiator | TPO | 5 | 5 | 5 | 5 | 5 | 5 | 5 | 5 | 5 | 5 | 5 | 5 |
| | Irg819 | 5 | 5 | 5 | 5 | 5 | 5 | 5 | 5 | 5 | 5 | 5 | 5 |
| | ITX | 1 | 1 | 1 | 1 | 1 | 1 | 1 | 1 | 1 | 1 | 1 | 1 |
| Dispersant | BYK JET9150 | — | — | — | — | — | — | — | — | — | — | — | — |
| | BYK JET9151 | — | — | — | — | — | — | — | — | — | — | — | — |
| | D-1 | — | — | — | — | — | — | — | — | — | — | — | — |
| | D-2 | — | — | — | — | — | — | — | — | — | — | — | — |
| | D-3 | — | — | — | — | — | — | — | — | — | — | — | — |
| | D-4 | — | — | — | — | — | — | — | — | — | — | — | — |
| | D-5 | — | — | — | — | — | — | — | — | — | — | — | — |
| | D-6 | — | — | — | — | — | — | — | — | — | — | — | — |
| | D-7 | — | — | — | — | — | — | — | — | — | — | — | — |
| | D-8 | — | — | — | — | — | — | — | — | — | — | — | — |
| | D-9 | — | — | — | — | — | — | — | — | — | — | — | — |
| | D-10 | 1 | — | — | — | — | — | — | — | — | — | — | — |
| | D-11 | — | 1 | — | — | — | — | — | — | — | — | — | — |
| | D-12 | — | — | 1 | — | — | — | — | — | — | — | — | — |
| | D-13 | — | — | — | 1 | — | — | — | — | — | — | — | — |
| | D-14 | — | — | — | — | 1 | — | — | — | — | — | — | — |
| | D-15 | — | — | — | — | — | 1 | — | — | — | — | — | — |
| | D-16 | — | — | — | — | — | — | 1 | — | — | — | — | — |
| | D-17 | — | — | — | — | — | — | — | 1 | — | — | — | — |
| | D-18 | — | — | — | — | — | — | — | — | 1 | — | — | — |
| | D-19 | — | — | — | — | — | — | — | — | — | 1 | — | — |
| | D-20 | — | — | — | — | — | — | — | — | — | — | 1 | — |
| | D-21 | — | — | — | — | — | — | — | — | — | — | — | 1 |
| Polymerization inhibitor | OH-TEMPO | 0.3 | 0.3 | 0.3 | 0.3 | 0.3 | 0.3 | 0.3 | 0.3 | 0.3 | 0.3 | 0.3 | 0.3 |
| | UV-12 | 0.2 | 0.2 | 0.2 | 0.2 | 0.2 | 0.2 | 0.2 | 0.2 | 0.2 | 0.2 | 0.2 | 0.2 |
| Total(parts by mass) | | 100 | 100 | 100 | 100 | 100 | 100 | 100 | 100 | 100 | 100 | 100 | 100 |
| Storage stability | | 4 | 3 | 3 | 3 | 3 | 3 | 4 | 5 | 5 | 5 | 5 | 5 |
| Discharge stability | | 5 | 5 | 5 | 5 | 5 | 5 | 5 | 3 | 5 | 5 | 5 | 5 |
| Curability | | 5 | 5 | 5 | 5 | 5 | 5 | 5 | 5 | 5 | 5 | 5 | 5 |

TABLE 4-continued

| | | | | | | | | | | | | |
|---|---|---|---|---|---|---|---|---|---|---|---|---|
| Stretchability at high temperature | 4 | 3 | 3 | 3 | 3 | 3 | 4 | 5 | 5 | 5 | 5 | 5 |

TABLE 5

| Example No. | | 26 | 27 | 28 | 29 | 30 | 31 | 32 | 33 | 34 | 35 | 36 |
|---|---|---|---|---|---|---|---|---|---|---|---|---|
| Magenta mill base (SOLSPERSE 32000) | | 15 | 15 | 15 | 15 | 15 | 15 | — | — | — | 15 | 15 |
| Cyan mill base | | — | — | — | — | — | — | — | — | — | — | — |
| Yellow mill base | | — | — | — | — | — | — | — | — | — | — | — |
| Black mill base | | — | — | — | — | — | — | — | — | — | — | — |
| White mill base | | — | — | — | — | — | — | — | — | — | — | — |
| Magenta mill base (BYK JET9151) | | — | — | — | — | — | — | 15 | 15 | 15 | — | — |
| Monomer | NVC | 25 | 25 | 25 | 25 | 25 | 25 | 10 | 25 | 40 | 25 | 25 |
| | IBOA | 23.5 | 23.5 | 23.5 | — | 43.5 | 23.5 | 38.5 | 23.5 | 8.5 | 23.5 | 23.5 |
| | PEA | 20 | 20 | 20 | 43.5 | — | 24 | 20 | 20 | 20 | — | — |
| | CTFA | — | — | — | — | — | — | — | — | — | 20 | — |
| | EOEOEA | — | — | — | — | — | — | — | — | — | — | 20 |
| | TBCHA | — | — | — | — | — | — | — | — | — | — | — |
| | CD420 | — | — | — | — | — | — | — | — | — | — | — |
| Oligomer | CN9031 | 4 | 4 | 4 | 4 | 4 | — | 4 | 4 | 4 | 4 | 4 |
| Photopolymerization initiator | TPO | 5 | 5 | 5 | 5 | 5 | 5 | 5 | 5 | 5 | 5 | 5 |
| | Irg819 | 5 | 5 | 5 | 5 | 5 | 5 | 5 | 5 | 5 | 5 | 5 |
| | ITX | 1 | 1 | 1 | 1 | 1 | 1 | 1 | 1 | 1 | 1 | 1 |
| Dispersant | BYK JET9150 | — | — | — | — | — | — | — | — | — | — | — |
| | BYK JET9151 | — | — | — | 1 | 1 | 1 | — | — | — | 1 | 1 |
| | D-22 | 1 | — | — | — | — | — | — | — | — | — | — |
| | D-23 | — | 1 | — | — | — | — | — | — | — | — | — |
| | D-24 | — | — | 1 | — | — | — | — | — | — | — | — |
| | SOLSPERSE 32000 | — | — | — | — | — | — | 1 | 1 | 1 | — | — |
| Polymerization inhibitor | OH-TEMPO | 0.3 | 0.3 | 0.3 | 0.3 | 0.3 | 0.3 | 0.3 | 0.3 | 0.3 | 0.3 | 0.3 |
| | UV-12 | 0.2 | 0.2 | 0.2 | 0.2 | 0.2 | 0.2 | 0.2 | 0.2 | 0.2 | 0.2 | 0.2 |
| Total (parts by mass) | | 100 | 100 | 100 | 100 | 100 | 100 | 100 | 100 | 100 | 100 | 100 |
| Storage stability | | 5 | 5 | 5 | 5 | 5 | 5 | 5 | 5 | 4 | 5 | 3 |
| Discharge stability | | 5 | 5 | 5 | 5 | 5 | 5 | 5 | 5 | 4 | 5 | 5 |
| Curability | | 5 | 5 | 5 | 5 | 5 | 5 | 4 | 5 | 5 | 5 | 3 |
| Stretchability at high temperature | | 5 | 5 | 5 | 5 | 5 | 5 | 5 | 5 | 5 | 3 | 5 |

| Example No. | | 37 | 38 | 39 | 40 | 41 | 42 | 43 | 44 | 45 | 46 | 47 | 48 | 49 |
|---|---|---|---|---|---|---|---|---|---|---|---|---|---|---|
| Magenta mill base (SOLSPERSE 32000) | | 15 | 15 | — | — | — | — | 15 | 15 | 15 | 15 | 15 | 15 | 15 |
| Cyan mill base | | — | — | 9 | — | — | — | — | — | — | — | — | — | — |
| Yellow mill base | | — | — | — | 7 | — | — | — | — | — | — | — | — | — |
| Black mill base | | — | — | — | — | 9 | — | — | — | — | — | — | — | — |
| White mill base | | — | — | — | — | — | 30 | — | — | — | — | — | — | — |
| Magenta mill base (BYK JET9151) | | — | — | — | — | — | — | — | — | — | — | — | — | — |
| Monomer | NVC | 25 | 25 | 25 | 25 | 25 | 25 | 25 | 25 | 25 | 25 | 25 | 25 | 25 |
| | IBOA | 23.5 | 23.5 | 23.5 | 23.5 | 23.5 | 13.5 | 43.5 | — | — | — | — | 23.5 | 23.5 |
| | PEA | — | — | 26 | 28 | 26 | 15 | — | 43.5 | 47.5 | 46.5 | 43.5 | 20 | 20 |
| | CTFA | — | — | — | — | — | — | — | — | — | — | — | — | — |
| | EOEOEA | — | — | — | — | — | — | — | — | — | — | — | — | — |
| | TBCHA | 20 | — | — | — | — | — | — | — | — | — | — | — | — |
| | CD420 | — | 20 | — | — | — | — | — | — | — | — | — | — | — |
| Oligomer | CN9031 | 4 | 4 | 4 | 4 | 4 | 4 | 4 | 4 | — | 4 | 4 | 4 | 4 |
| Photopolymerization initiator | TPO | 5 | 5 | 5 | 5 | 5 | 5 | 10 | 5 | 5 | — | 11 | 5 | 5 |
| | Irg819 | 5 | 5 | 5 | 5 | 5 | 5 | — | 5 | 5 | 7 | — | 5 | 5 |
| | ITX | 1 | 1 | 1 | 1 | 1 | 1 | 1 | 1 | 1 | 1 | — | 1 | 1 |
| Dispersant | BYK JET9150 | — | — | — | — | — | — | — | — | — | — | — | — | — |
| | BYK JET9151 | 1 | 1 | 1 | 1 | 1 | 1 | 1 | 1 | 1 | 1 | 1 | 1 | 1 |
| | D-22 | — | — | — | — | — | — | — | — | — | — | — | — | — |
| | D-23 | — | — | — | — | — | — | — | — | — | — | — | — | — |
| | D-24 | — | — | — | — | — | — | — | — | — | — | — | — | — |
| | SOLSPERSE 32000 | — | — | — | — | — | — | — | — | — | — | — | — | — |
| Polymerization inhibitor | OH-TEMPO | 0.3 | 0.3 | 0.3 | 0.3 | 0.3 | 0.3 | 0.3 | 0.3 | 0.3 | 0.3 | 0.3 | 0.5 | — |
| | UV-12 | 0.2 | 0.2 | 0.2 | 0.2 | 0.2 | 0.2 | 0.2 | 0.2 | 0.2 | 0.2 | 0.2 | — | 0.5 |
| Total (parts by mass) | | 100 | 100 | 100 | 100 | 100 | 100 | 100 | 100 | 100 | 100 | 100 | 100 | 100 |
| Storage stability | | 5 | 5 | 5 | 5 | 5 | 5 | 5 | 5 | 5 | 5 | 5 | 5 | 5 |
| Discharge stability | | 5 | 3 | 5 | 5 | 5 | 5 | 5 | 5 | 4 | 5 | 5 | 5 | 5 |

TABLE 5-continued

| | | | | | | | | | | | | | |
|---|---|---|---|---|---|---|---|---|---|---|---|---|---|
| Curability | 5 | 5 | 5 | 5 | 5 | 5 | 5 | 5 | 5 | 5 | 4 | 5 | 5 |
| Stretchability at high temperature | 5 | 5 | 5 | 5 | 5 | 5 | 5 | 4 | 5 | 5 | 5 | 5 | 5 |

TABLE 6

| Comparative Example No. | | 1 | 2 | 3 | 4 | 5 | 6 | 7 |
|---|---|---|---|---|---|---|---|---|
| Magenta mill base (SOLSPERSE 32000) | | 15 | 15 | 15 | 15 | 15 | 15 | 15 |
| Monomer | NVC | 20 | 30 | 40 | 20 | 30 | 40 | — |
| | IBOA | 28.5 | 18.5 | 8.5 | 28.5 | 18.5 | 8.5 | 48.5 |
| | PEA | 20 | 20 | 20 | 20 | 20 | 20 | 20 |
| Oligomer | CN9031 | 4 | 4 | 4 | 4 | 4 | 4 | 4 |
| Photopolymerization initiator | TPO | 5 | 5 | 5 | 5 | 5 | 5 | 5 |
| | Irg819 | 5 | 5 | 5 | 5 | 5 | 5 | 5 |
| Dispersant | Synthetic dispersant E | — | — | — | 1 | 1 | 1 | 1 |
| | SOLSPERSE 32000 | 1 | 1 | 1 | — | — | — | — |
| Polymerization inhibitor | OH-TEMPO | 0.3 | 0.3 | 0.3 | 0.3 | 0.3 | 0.3 | 0.3 |
| | UV-12 | 0.2 | 0.2 | 0.2 | 0.2 | 0.2 | 0.2 | 0.2 |
| Total (parts by mass) | | 100 | 100 | 100 | 100 | 100 | 100 | 100 |
| Storage stability | | 1 | 1 | 1 | 1 | 1 | 1 | 3 |
| Discharge stability | | 1 | 1 | 1 | 1 | 1 | 1 | 3 |
| Curability | | 2 | 2 | 2 | 2 | 2 | 2 | 1 |
| Stretchability at high temperature | | 2 | 2 | 2 | 2 | 2 | 2 | 1 |

What is claimed is:

1. An inkjet ink composition comprising:
a maleimide-styrene copolymer having an ammonium salt structure, as Component A;
an N-vinyl compound, as Component B;
a colorant, as Component C; and
a photopolymerization initiator, as Component D,
wherein the Component A is a copolymer having at least a structure represented by Formula (A-1) below,

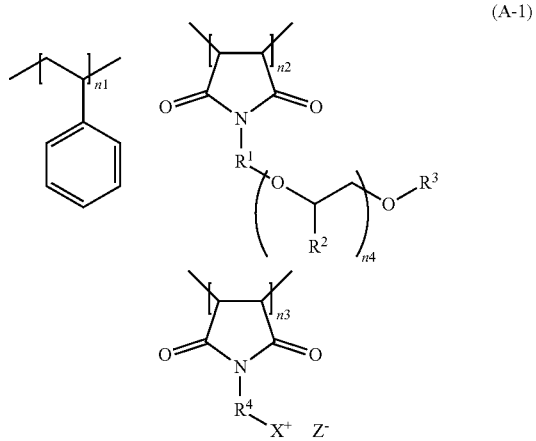

(A-1)

wherein in Formula (A-1) above $R^1$ denotes an alkylene group, the $R^2$s independently denote a hydrogen atom or a methyl group, $R^3$ denotes a hydrogen atom or an alkyl group, $R^4$ denotes an alkylene group, $X^+$ denotes a quaternary ammonium group, $Z^-$ denotes a counteranion, n1, n2, and n3 independently denote the molar ratio of the respective constituent unit, (n1):(n2+n3)=1:99 to 99:1 is satisfied, n2:n3=1:99 to 99:1 is satisfied, and n4 denotes an integer of 1 or greater.

2. The inkjet ink composition according to claim 1, wherein the Component A has a weight-average molecular weight of 1,500 to 10,000.

3. The inkjet ink composition according to claim 1, wherein the Component A has an ethylene oxide structure and/or a propylene oxide structure.

4. The inkjet ink composition according to claim 1, wherein the Component A has a content of 0.01 to 5 mass % relative to the total mass of the inkjet ink composition.

5. The inkjet ink composition according to claim 1, wherein the Component B has a content of 1 to 40 mass % relative to the total mass of the inkjet ink composition.

6. The inkjet ink composition according to claim 1, wherein the Component C is a quinacridone pigment.

7. The inkjet ink composition according to claim 1, wherein the Component B is N-vinylcaprolactam.

8. The inkjet ink composition according to claim 1, wherein the Component D comprises an acylphosphine oxide compound.

9. The inkjet ink composition according to claim 1, wherein the inkjet ink composition comprises a monomer having a viscosity at 25° C. of no greater than 10 mPa·s, as Component E, in an amount of at least 30 mass % relative to the total mass of the inkjet ink composition.

10. The inkjet ink composition according to claim 9, wherein the Component E comprises at least one type of compound selected from the group of compounds below

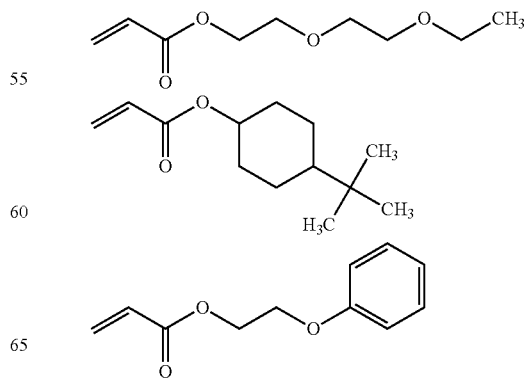

-continued

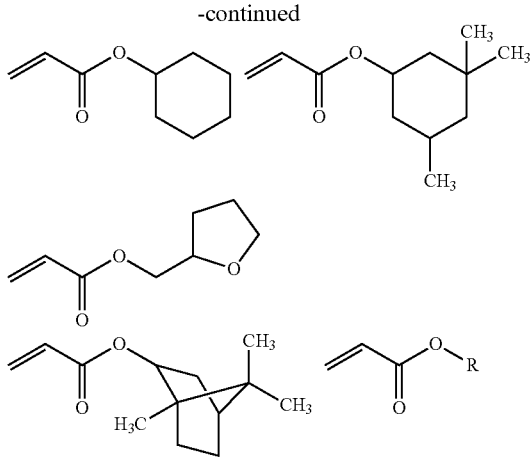

wherein R in the compounds denotes an alkyl group having 4 to 18 carbons.

11. An ink set comprising the inkjet ink composition according to claim 1.

12. An inkjet recording method comprising:
(a1) step of discharging the inkjet ink composition according to claim 1 onto a resin sheet by an inkjet method, and
(b1) a step of curing the inkjet ink composition by irradiating the discharged inkjet ink composition with actinic radiation.

13. The inkjet recording method according to claim 12, wherein a light source for the actinic radiation is a light-emitting diode.

14. A decorative sheet comprising an image layer provided above a resin sheet by curing the inkjet ink composition according to claim 1.

15. A decorative sheet molded product obtained by subjecting the decorative sheet according to claim 14 to vacuum forming, pressure forming, or vacuum/pressure forming.

16. The decorative sheet molded product according to claim 15, wherein the decorative sheet molded product is further subjected to hole making and/or cutting subsequent to the vacuum forming, pressure forming, or vacuum/pressure forming.

17. A process for producing an in-mold molded article, comprising
a step of placing the decorative sheet according to claim 14 on an inner wall of a cavity part formed by a plurality of molds, and
a step of injecting a molten resin into the cavity part via a gate.

18. A process for producing an in-mold molded article, comprising
a step of placing the decorative sheet molded product according to claim 15 on an inner wall of a cavity part formed by a plurality of molds, and
a step of injecting a molten resin into the cavity part via a gate.

* * * * *